(12) United States Patent
Kawakura et al.

(10) Patent No.: US 7,131,133 B1
(45) Date of Patent: Oct. 31, 2006

(54) ACCESS CONTROL METHOD AND INFORMATION UTILIZATION APPARATUS

(75) Inventors: Yasushi Kawakura, Pittsburgh, PA (US); Tetsuro Kimura, Tokyo (JP); Takashi Suzuoka, Kawasaki (JP)

(73) Assignee: Kabushiki Kaisha Toshiba (JP)

( * ) Notice: Subject to any disclaimer, the term of this patent is extended or adjusted under 35 U.S.C. 154(b) by 0 days.

(21) Appl. No.: 08/932,543

(22) Filed: Sep. 17, 1997

(30) Foreign Application Priority Data

Sep. 18, 1996 (JP) .................................. 8-246719

(51) Int. Cl.
*H04N 7/16* (2006.01)
*H04N 7/167* (2006.01)
*G06F 17/30* (2006.01)

(52) U.S. Cl. .......................... 725/25; 725/27; 725/29; 726/26; 726/27; 726/28; 726/29; 726/33; 380/230; 380/233

(58) Field of Classification Search .................... 725/1, 725/2, 5, 8, 25, 29, 27, 100, 104, 122, 134; 380/230–233, 239–241; 713/168–170; 709/103–105, 709/210–214; 710/269–270; 707/102; 726/26–33
See application file for complete search history.

(56) References Cited

U.S. PATENT DOCUMENTS

| | | | | | |
|---|---|---|---|---|---|
| 4,595,980 A | * | 6/1986 | Innes | | 704/8 |
| 4,636,942 A | * | 1/1987 | Chen et al. | | 710/269 |
| 4,833,710 A | * | 5/1989 | Hirashima | | 380/233 |
| 5,400,402 A | * | 3/1995 | Garfinkle | | 380/231 |
| 5,434,970 A | * | 7/1995 | Schiffleger | | 709/213 |
| 5,440,740 A | * | 8/1995 | Chen et al. | | 709/104 |
| 5,537,591 A | * | 7/1996 | Oka | | 707/102 |
| 5,548,345 A | * | 8/1996 | Brian et al. | | 725/27 |
| 5,654,746 A | * | 8/1997 | McMullan, Jr. et al. | | 725/29 |
| 5,839,054 A | * | 11/1998 | Wright et al. | | 340/7.29 |
| 6,105,134 A | * | 8/2000 | Pinder et al. | | 713/170 |
| 6,282,293 B1 | * | 8/2001 | Itoh et al. | | 380/233 |

FOREIGN PATENT DOCUMENTS

| | | |
|---|---|---|
| JP | 02-297626 | 12/1990 |
| JP | 05-127969 | 5/1993 |
| JP | 06-095871 | 4/1994 |
| JP | 06-259012 | 9/1994 |
| JP | 07-262072 | 10/1995 |
| JP | 08-016384 | 1/1996 |

OTHER PUBLICATIONS

Mori etal., "Superdistribution: The Concept and the Architecture," The Transactions of the IEICE, vol. E73 No. 7, Jul. 1990.

* cited by examiner

*Primary Examiner*—Hai Tran
(74) *Attorney, Agent, or Firm*—Banner & Witcoff, Ltd.

(57) ABSTRACT

The encoded contents of a piece of delivered information is accompanied by an applicable time data indicating a specific time period for authorizing a particular mode of utilization. When a request for utilizing the contents is issued in an information utilization apparatus, it determines if the current time agrees with the time authorizing the requested utilization by referring to the time data annexed to the encoded contents. If the request is acceptable at the current time, a set of processing steps is carried out for decoding the encoded contents and other necessary operations. Thus, an information access control method can be adapted to have flexibility in setting charges and access requirements for the contents of information that can change the value and the mode of utilization with time.

24 Claims, 16 Drawing Sheets

| FUNCTION | APPLICABLE PERIOD |
|---|---|
| DISPLAY | NO LIMIT |
| PRINTING | 0 0'CLOCK, SEPTEMBER 12, 1996 AND ON |
| STORAGE | 0 0'CLOCK, SEPTEMBER 14, 1996 AND ON |
| ⋮ | |

FIG. 3

| TIME AND DATE | DISPLAY | PRINTING | STORAGE | ⋯ |
|---|---|---|---|---|
| − 0 0'CLOCK, SEPTEMBER 12, 1996 | ○ | × | × | ⋯ |
| 0 0'CLOCK, SEPTEMBER 12, 1996 − 0 0'CLOCK, SEPTEMBER 14, 1996 | ○ | ○ | × | ⋯ |
| 0 0'CLOCK, − SEPTEMBER 14, 1996 | ○ | ○ | ○ | ⋯ |

FIG. 4

| TIME AND DATE | DISPLAY | PRINTING | STORAGE | ... | CHARGE |
|---|---|---|---|---|---|
| - 0 0'CLOCK, SEPTEMBER 12, 1996 | O | × | × | ... | A |
| 0 0'CLOCK, SEPTEMBER 12, 1996 - 0 0'CLOCK, SEPTEMBER 14, 1996 | O | O | × | ... | B |
| 0 0'CLOCK, SEPTEMBER 14, 1996 - | O | O | O | ... | C |

FIG. 5A

| TIME AND DATE | DISPLAY | PRINTING | STORAGE | ... | CHARGE ||| ... |
| --- | --- | --- | --- | --- | --- | --- | --- | --- |
| | | | | | DISPLAY | PRINTING | STORAGE | |
| – 0 0'CLOCK, SEPTEMBER 12, 1996 | ○ | × | × | ... | A | — | — | ... |
| 0 0'CLOCK, SEPTEMBER 12, 1996 – 0 0'CLOCK, SEPTEMBER 14, 1996 | ○ | ○ | × | ... | B | D | — | ... |
| 0 0'CLOCK, SEPTEMBER 14, 1996 – | ○ | ○ | ○ | ... | C | E | F | ... |

FIG. 5B

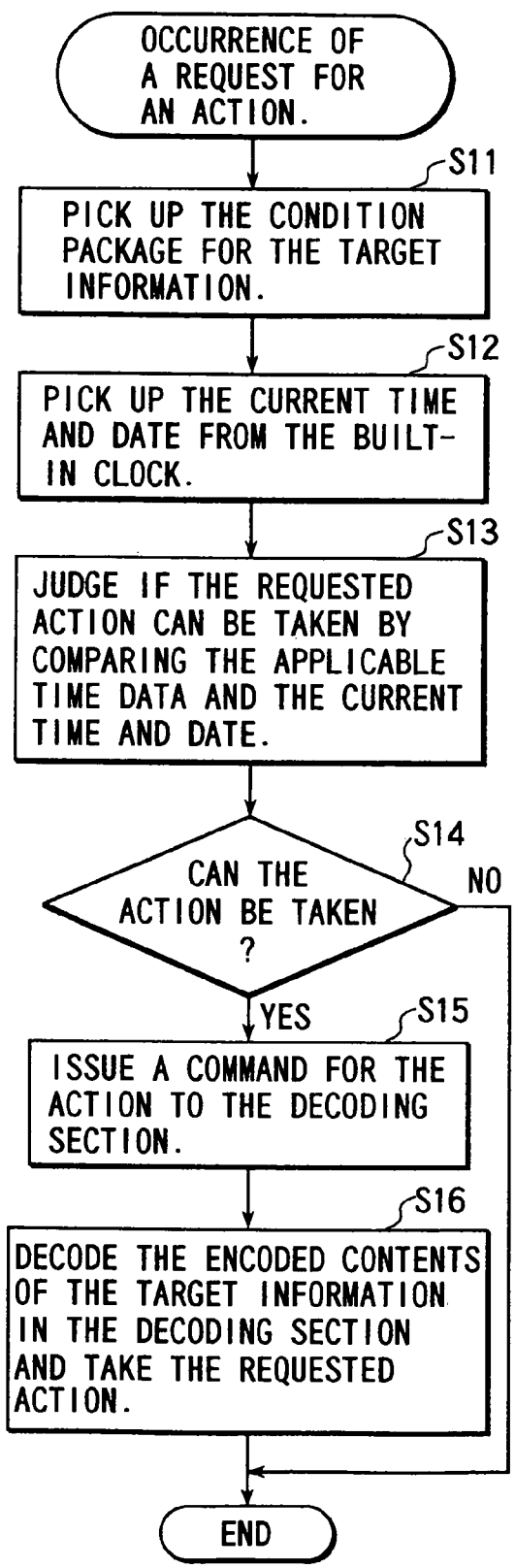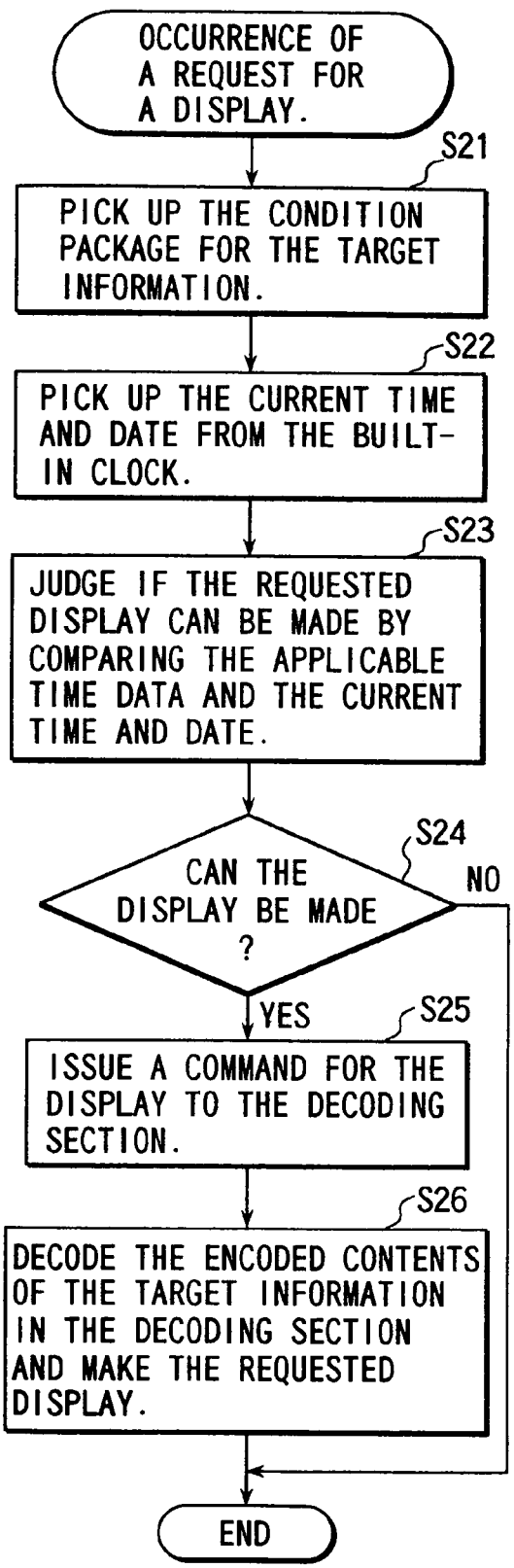
FIG. 6
FIG. 8

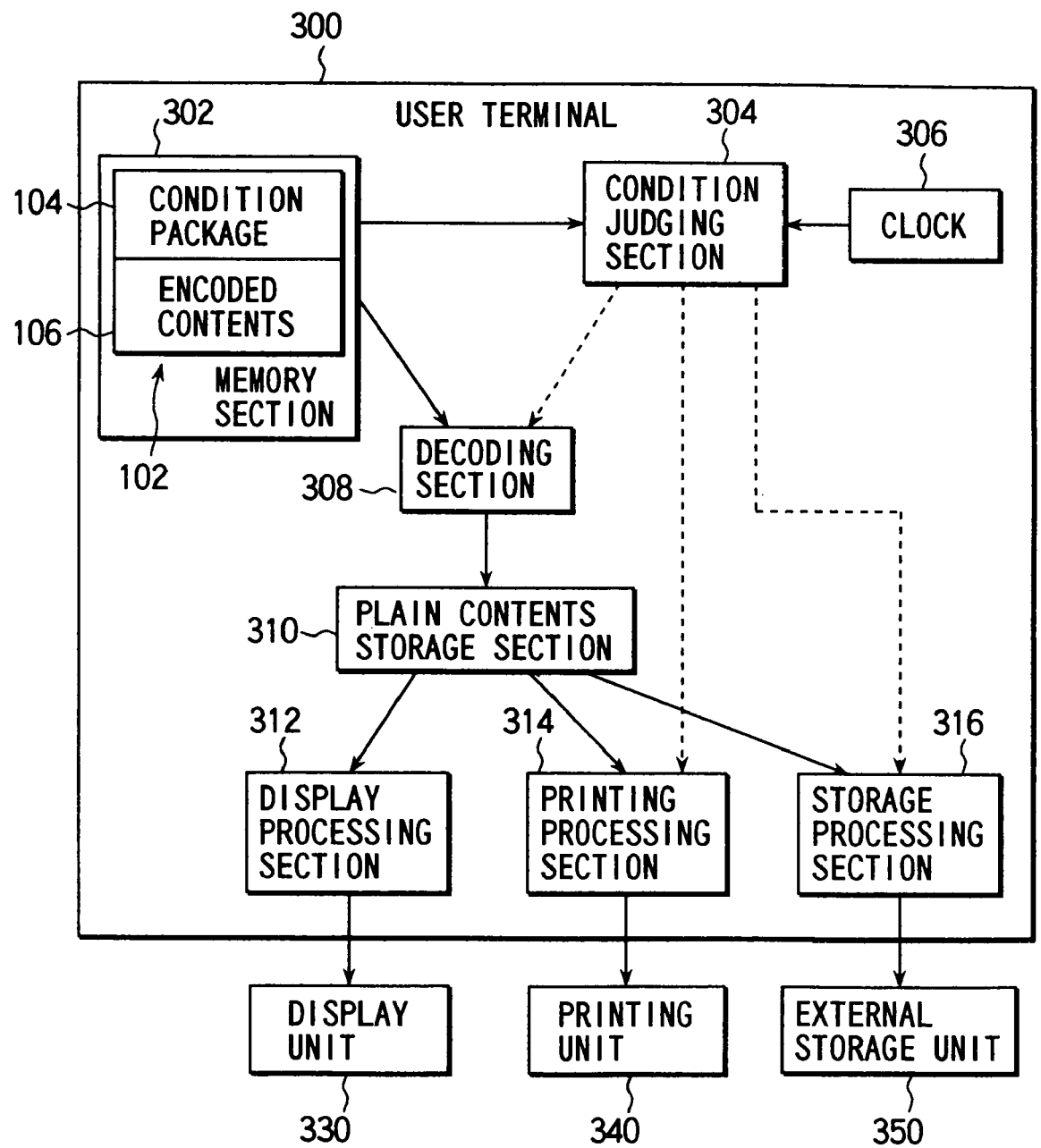
F I G. 7

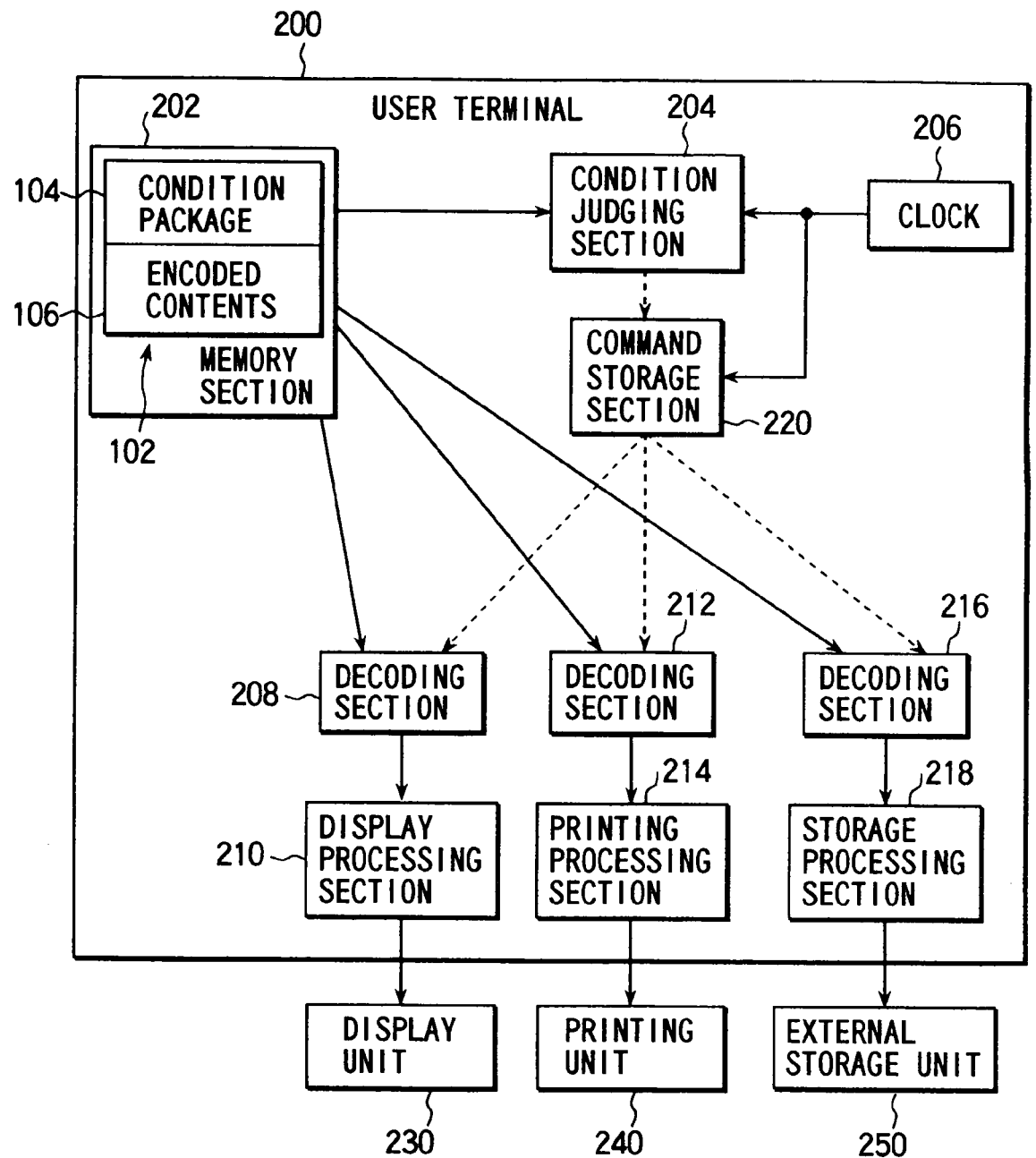
F I G. 1 1

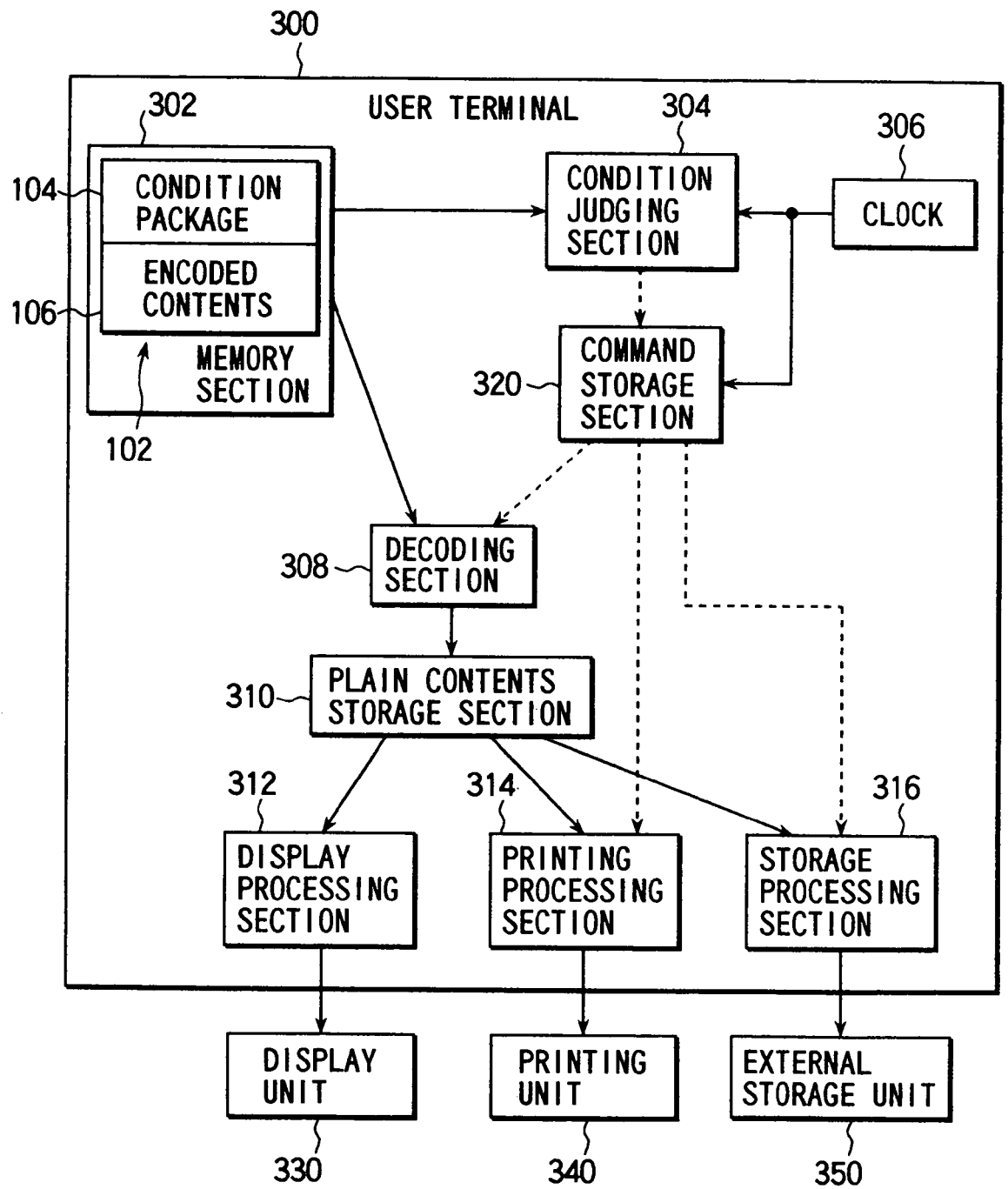
F I G. 14

ACCESS CONTROL METHOD AND INFORMATION UTILIZATION APPARATUS

BACKGROUND OF THE INVENTION

The present invention relates to an access control method for controlling the right of accessing and utilizing electronically distributed information and to an apparatus adapted to accessing and utilizing such information.

Currently, various pieces of information are distributed for sale electronically by way of data communication networks including the Internet and other satellite communication networks and recording media including CD-ROMs. Such pieces of information typically include the contents of newspapers, magazines, computer programs and recorded videos and audios.

However, there arises the serious problem of pirate copies of these contents that are illegally sold or leased to unauthorized third parties because the electronic contents can be copied without degradation. In particular, there is no effective way of prohibiting the act of making pirate copies if the contents are sold on a payment on delivery basis, in the case where the accounting is done only when the user has obtained the contents. While there may be legal means of confiscating and destructing pirate copies to be taken by the related authorities and that of suing the pirates for the lost profit to be taken by the infringed, such actions entails enormous time and cost so that a large number of pirate copies are actually on the market.

The pay-per-view system is an alternative proposed to bypass the problem of pirate copies. With this system, the contents of information are encoded before being delivered to the subscriber so as to prevent the user from utilizing the contents at his or her free will. For example, the user is prohibited from keeping the contents in a decoded state and the encoded contents can be decoded each time the user uses them, so that the accounting is done when the encoded contents are decoded. By adopting this method, the accounting can be done without fail because the encoded contents must be decoded when the user uses them.

A typical known pay-per-view system will be described by referring to FIG. 1 of the accompanying drawing.

The contents of information to be delivered are encoded by the information provider 1000. The encoded contents 1006 are accompanied by a condition package 1004 including the description on the encoding system, the charge per view, the authorization for printing and/or storage, if any, and other conditions on the use of the contents to complete the information 1002 to be delivered. The information 1002 is then delivered to the user terminal 2000 by way of one or more than one communication networks or a CR-ROM and stored in the memory section 2002 before it is retrieved.

When the user requests the user terminal 2000 to operate for displaying, printing or storing the information, the condition judging section 2004 judges if the requested operation is authorized or not by referring to the condition package 1004 of the information 1002. If authorized, it issues a command for carrying out the requested operation. Upon receiving the command, the decoding section 2006 decodes the encoded content 1006 and the decoded contents are appropriately displayed on the display screen of a display unit 2030 by a display processing section 2008, printed to produce a hard copy by a printing unit 2040 under the control of a printing processing section 2010 or stored in an external storage unit 2050 by a storage processing section 2012. If, on the other hand, the requested operation is not authorized, the condition judging section 2004 does not issue any command for carrying out the operation (or issues a command prohibiting the operation) and the request is refused.

Since the encoded contents are decoded whenever they are used so that the user is charged for each decoding operation of the decoding section 2006. Specific examples of charging methods that can be used for the system under consideration include the one for up-loading the record of decoding operations stored in the user terminal 2000 to the information provider 1000 and charging collectively at a later date and the one for providing the user with a pre-paid card that can be used at the user terminal 2000 for decoding operations.

With the above system, the condition package 1004 of the information 1002 delivered to the user terminal 2000 contains only "yes" or "no" for each operation. In other words, it controls the right of access to the delivered information for printing, storage and/or other purposes only in terms of "yes" and "no". Additionally, the charge is uniform and invariable because this conventional pay-per-view system does not take changes in the value of the information and the mode of utilization thereof into consideration. Differently stated, this conventional system is adapted to contents such as those of movie films and fictions that are intended to be accessed by a large number of people and whose values do not significantly change with time.

However, such a pay-per-view system is not adapted to the contents of newspapers and magazines whose values can change significantly with time. The contents of newspaper and magazines are valuable when they are delivered for the first time because they are new and current. Then, they quickly change their values as they change their nature with time from news to records.

Thus, as described above, known conventional pay-per-view systems are not adapted to have flexibility in setting charges and access requirements for the contents of newspapers and magazines that can change the values in a short period of time because such systems do not take changes in the value of the information they provide and the mode of utilization thereof into consideration.

BRIEF SUMMARY OF THE INVENTION

Accordingly, it is an object of the present invention to provide an access control method and an information utilization apparatus that are adapted to have flexibility in setting charges and access requirements for the contents of information that can change the value and the mode of utilization with time.

According to one aspect of the present invention, there is provided an information utilization apparatus comprising: memory means for storing a delivered piece of information including encoded data and applicable time data defining the time period authorizing the use of the encoded data; decoding means for decoding the encoded data stored in the memory means; processing means for carrying out a set of processing steps for an operation requested by the user on the data decoded by the decoding means; and control means for controlling the decoding means and the processing means to operate at an appropriate time in accordance with the operation requested by the user and the applicable time data stored in the memory means.

In this apparatus, the control means may comprise judging means for determining if the current time agrees with the time authorizing the use of the encoded data. In this case, the control means may control the processing means to operate when the judging means determines that the current time agrees with the time authorizing the use of the encoded data. The apparatus may further comprise reserving means for reserving the operation of the processing means until the time authorizing the use of the encoded data when the judging means determines that the current time does not agree with the time authorizing the use of the encoded data.

According to another aspect of the present invention, there is provided an information utilization apparatus comprising: memory means for storing a delivered piece of information including encoded data and applicable time data defining the time period authorizing the use of the encoded data; a plurality of decoding means for decoding the encoded data stored in the memory means; a plurality of processing means arranged respectively corresponding to the plurality of decoding means for carrying out one of different sets of processing steps for an operation requested by the user on the data decoded by the decoding means; judging means, upon receiving a request for an operation from the user, for determining if the current time agrees with the time authorizing the use of the encoded data by referring to the applicable time data; and operation command issuing means for issuing a command responding to the request for an operation to the corresponding decoding means and the corresponding processing means if the current time is determined by the judging means to agree with the time authorizing the use of the encoded data by referring to the applicable time data.

According to another aspect of the present invention, there is provided an information utilization apparatus comprising: memory means for storing a delivered piece of information including encoded data and applicable time data defining the time period authorizing the use of the encoded data; decoding means for decoding the encoded data stored in the memory means; plain data storage means for storing the data decoded by the decoding means; a plurality of processing means for carrying out one of different sets of processing steps for an operation requested by the user on the data decoded by the decoding means; judging means, upon receiving a request for an operation from the user, for determining if the current time agrees with the time authorizing the use of the encoded data by referring to the applicable time data; and operation command issuing means for issuing a command responding to the request for an operation to the decoding means and the corresponding processing means if the current time is determined by the judging means to agree with the time authorizing the use of the encoded data by referring to the applicable time data and the encoded data storage means does not store the encoded data, and issuing a command responding to the request for an operation to the corresponding processing means if the current time is determined by the judging means to agree with the time authorizing the use of the encoded data and the plain data storage means stores the decoded data.

According to another aspect of the present invention, there is provided an information utilization apparatus comprising: memory means for storing a delivered piece of information including encoded data and applicable time data defining the time period authorizing the use of the encoded data; a plurality of decoding means for decoding the encoded data stored in the memory means; a plurality of processing means arranged respectively corresponding to the plurality of decoding means for carrying out one of different sets of processing steps for an operation requested by the user on the data decoded by the decoding means; judging means, upon receiving a request for an operation from the user, for determining if the current time agrees with the time authorizing the use of the encoded data by referring to the applicable time data; operation command issuing means for issuing a command responding to the request for an operation to the corresponding decoding means and the corresponding processing means if the current time is determined by the judging means to agree with the time authorizing the use of the encoded data; and operation command reserving means for reserving the issuance of a command responding to the request for an operation until the time authorizing the use of the encoded data if the current time is determined by the judging means not to agree with the time authorizing the use of the encoded data.

According to another aspect of the present invention, there is provided an information utilization apparatus comprising: memory means for storing a delivered piece of information including encoded data and applicable time data defining the time period authorizing the use of the encoded data; decoding means for decoding the encoded data stored in the memory means; plain data storage means for storing the data decoded by the decoding means; a plurality of processing means for carrying out one of different sets of processing steps for an operation requested by the user on the data decoded by the decoding means; judging means, upon receiving a request for an operation from the user, for determining if the current time agrees with the time authorizing the use of the encoded data by referring to the applicable time data; operation command issuing means for issuing a command responding to the request for an operation to the decoding means and the corresponding processing means if the current time is determined by the judging means to agree with the time authorizing the use of the encoded data by referring to the applicable time data and the plain data storage means does not store the decoded data, and issuing a command responding to the request for an operation to the corresponding processing means if the current time is determined by the judging means to agree with the time authorizing the use of the encoded data and the plain data storage means stores the decoded data; and operation command reserving means for reserving the issuance of a command responding to the request for an operation until the time authorizing the use of the encoded data if the current time is determined by the judging means not to agree with the time authorizing the use of the encoded data.

According to another aspect of the present invention, there is provided an information access control method for use in an information utilization apparatus having a memory for storing a delivered piece of information including encoded data, the method comprising the steps of: picking up the applicable time data added to the encoded data and indicating the time period authorizing the use of the encoded data in response to a user request for an operation; and decoding the encoded data stored in the memory and carrying out a set of processing steps for the operation requested by the user at an appropriate time according to the picked up applicable time data.

According to another aspect of the present invention, there is provided an information access control method for use in an information utilization apparatus having a memory for storing a delivered piece of information including encoded data, the method comprising the steps of: arranging a plurality of decoding sections for decoding the encoded data stored in the memory; arranging a plurality of processing sections arranged respectively corresponding to the plurality of decoding section for carrying out one of different sets of processing steps for an operation requested by the user on the data decoded by the decoding section; judging, upon receiving a request for an operation from the user, for determining if the current time agrees with the time authorizing the use of the encoded data by referring to the applicable time data; and issuing a command responding to the request for an operation to the corresponding decoding section and the corresponding processing section if the current time is determined in the judging step to agree with the time authorizing the use of the encoded data by referring to the applicable time data.

According to another aspect of the present invention, there is provided an information access control method for use in an information utilization apparatus having a memory for storing a delivered piece of information including encoded data, the method comprising the steps of: arranging a decoding section for decoding the encoded data stored in the memory; arranging a plain data storage section for storing the data decoded by the decoding section; arranging a plurality of processing section for carrying out one of different sets of processing steps for an operation requested by the user on the data decoded by the decoding section; judging, upon receiving a request for an operation from the user, for determining if the current time agrees with the time authorizing the use of the encoded data by referring to the applicable time data; and issuing a command responding to the request for an operation to the decoding section and the corresponding processing section if the current time is determined in the judging step to agree with the time authorizing the use of the encoded data by referring to the applicable time data and the plain data storage section does not store the decoded data, and issuing a command responding to the request for an operation to the corresponding processing section if the current time is determined in the judging step to agree with the time authorizing the use of the encoded data and the plain data storage section stores the decoded data.

According to another aspect of the present invention, there is provided an information access control method for use in an information utilization apparatus having a memory for storing a delivered piece of information including encoded data, the method comprising the steps of: arranging a plurality of decoding section for decoding the encoded data stored in the memory; arranging a plurality of processing sections arranged respectively corresponding to the plurality of decoding section for carrying out one of different sets of processing steps for an operation requested by the user on the data decoded by the decoding section; judging, upon receiving a request for an operation from the user, for determining if the current time agrees with the time authorizing the use of the encoded data by referring to the applicable time data; issuing a command responding to the request for an operation to the corresponding decoding section and the corresponding processing section if the current time is determined in the judging step to agree with the time authorizing the use of the encoded data; and reserving the issuance of a command responding to the request for an operation until the time authorizing the use of the encoded data if the current time is determined in the judging step not to agree with the time authorizing the use of the encoded data.

According to another aspect of the present invention, there is provided an information access control method for use in an information utilization apparatus having a memory for storing a delivered piece of information including encoded data, the method comprising the steps of: arranging a decoding section for decoding the encoded data stored in the memory; arranging a plain data storage section for storing the data decoded by the decoding section; a plurality of processing section for carrying out one of different sets of processing steps for an operation requested by the user on the data decoded by the decoding section; judging, upon receiving a request for an operation from the user, for determining if the current time agrees with the time authorizing the use of the encoded data by referring to the applicable time data; issuing a command responding to the request for an operation to the decoding section and the corresponding processing section if the current time is determined in the judging step to agree with the time authorizing the use of the encoded data by referring to the applicable time data and the plain data storage section does not store the decoded data, and issuing a command responding to the request for an operation to the corresponding processing section if the current time is determined in the judging step to agree with the time authorizing the use of the encoded data and the plain data storage section stores the decoded data; and reserving the issuance of a command responding to the request for an operation until the time authorizing the use of the encoded data if the current time is determined in the judging step not to agree with the time authorizing the use of the encoded data.

Note that the terms "encode/decode" used in this specification include the meanings of "encrypt/decrypt" and the like. Moreover, note that the term "data" (i.e., encoded or decoded data) includes the meaning of "contents" which appears in the detailed description of the invention.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 3 schematically illustrates applicable time data including applicable time periods that can be used with any of the first through fourth embodiments of the invention.

FIG. 4 schematically illustrates another applicable time data including applicable time periods that can be used with any of the first through fourth embodiments of the invention.

FIGS. 5A and 5B schematically illustrate still other sets of time data including applicable time periods and a charge system that can be used with any of the first through fourth embodiments of the invention.

FIG. 6 is a flow chart of a processing operation that can be used for the first embodiment of the invention when there is an occurrence of a request for an action at a user terminal.

FIG. 7 is a schematic block diagram of an information distribution system that can be used with the second embodiment of the invention.

FIG. 8 is a flow chart of a processing operation that can be used for the second embodiment of the invention when there is an occurrence of a request for display at a user terminal.

FIG. 11 is a schematic block diagram of an information distribution system that can be used with the third embodiment of the invention.

FIG. 14 is a schematic block diagram of an information distribution system that can be used with the fourth embodiment of the invention.

DETAILED DESCRIPTION OF THE INVENTION

Now, the present invention will be described in greater detail by referring to the accompanying drawings that illustrate preferred embodiments of the invention.

1st Embodiment

Firstly, the first preferred embodiment will be described by referring to FIGS. 2 through 6 of the accompanying drawing.

Figure 1:
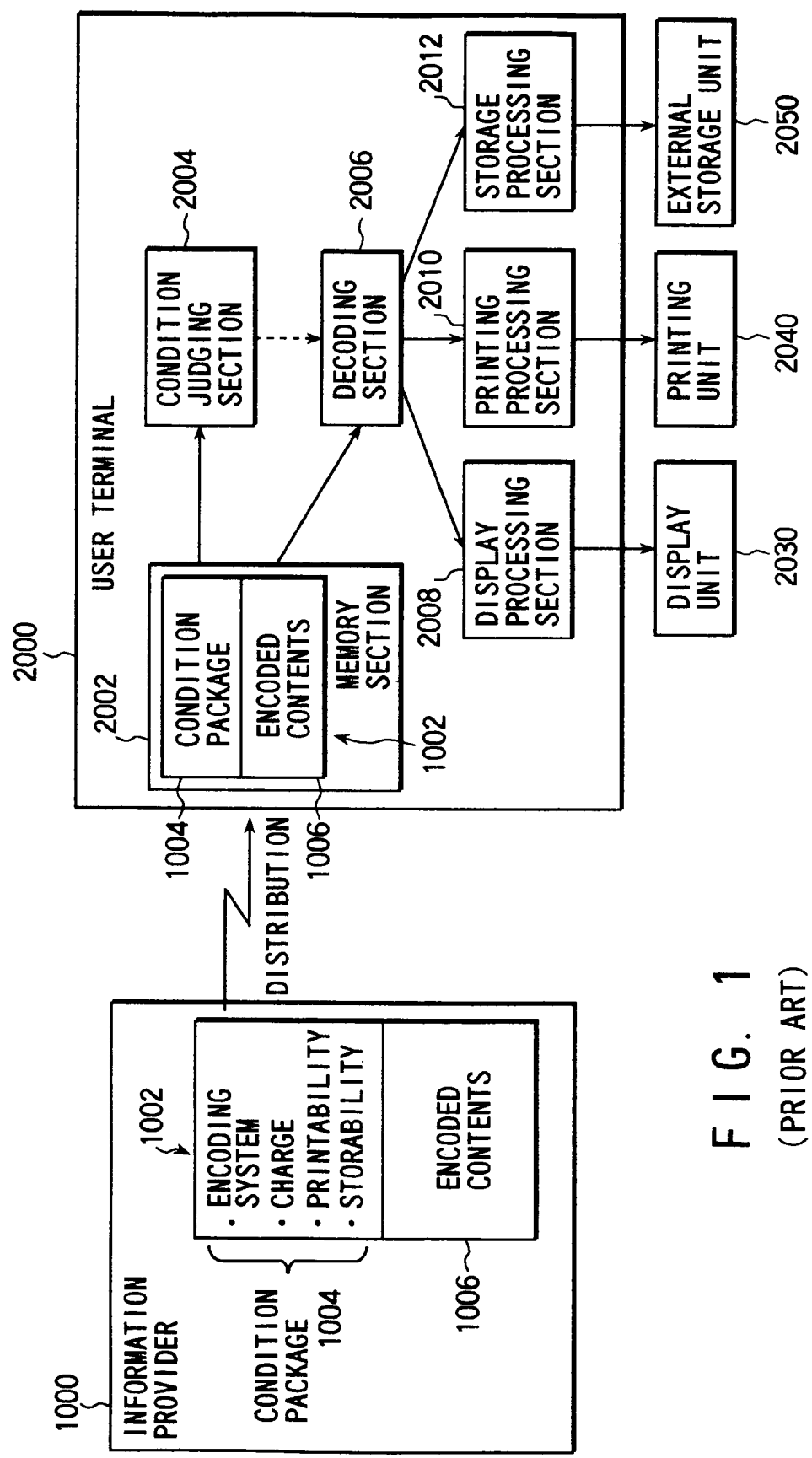
FIG. 1 is a schematic block diagram of a known information distribution system.
Figure 2:
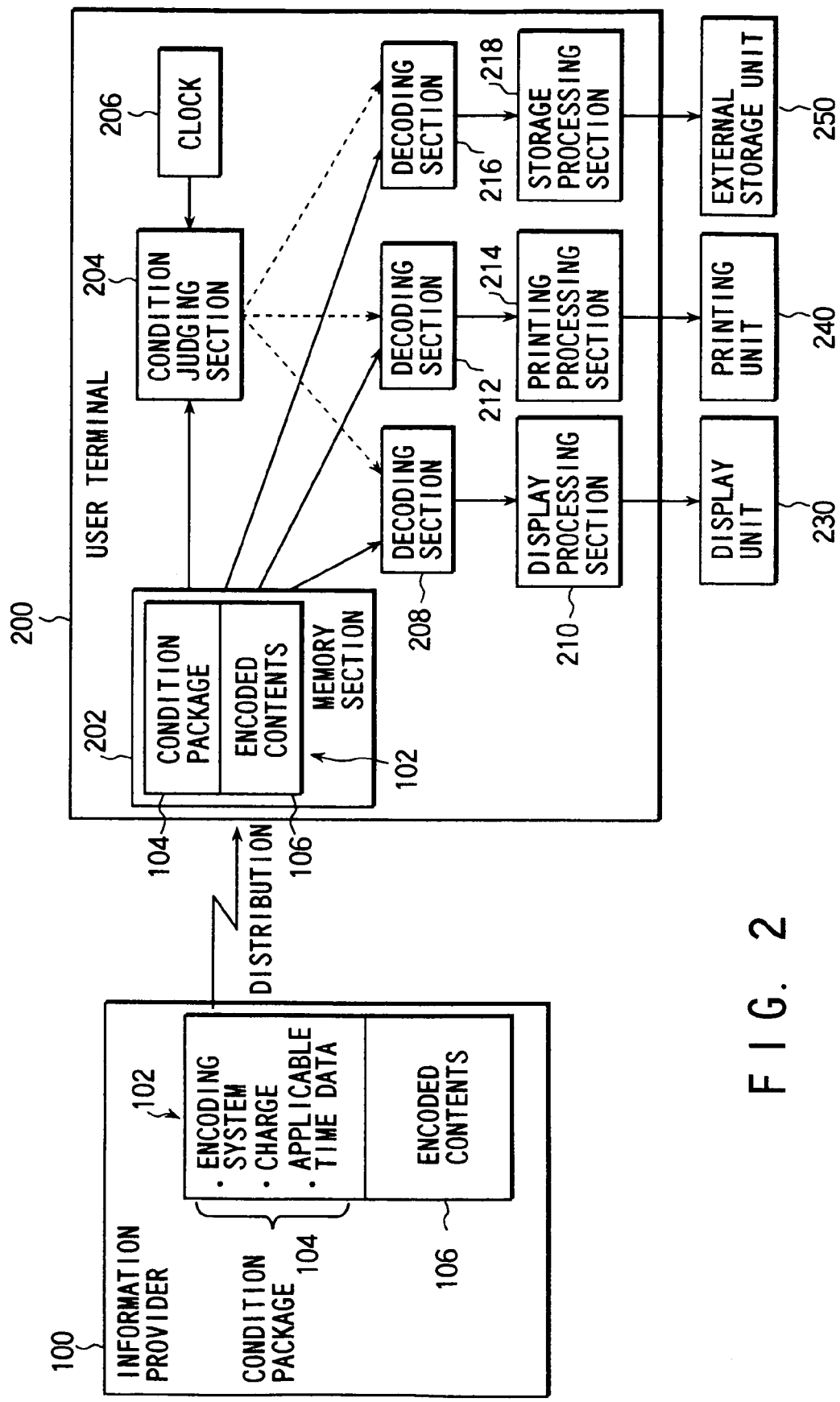
FIG. 2 is a schematic block diagram of an information distribution system that can be used with a first embodiment of the invention.

FIG. 2 is a schematic block diagram of an information distribution system.

The information distributed from the information provider 100 to each user terminal 200 includes a condition package 104 and encoded contents 106. The condition package 104 includes a description on the encoding system, a charging system, and applicable time data describing the applicable time period for each mode of utilization of the information. The applicable time includes also "yes" or "no" for the displayability, the printability and the storability of the information respectively as in the case of conventional systems.

Note that the condition package 104 cannot be falsified by the user terminal 200.

It is possible to check to see if the condition package 104 has been falsified by adding an electronic signature or the like thereto. If a falsification is detected in this check, the access processing after the detection of the falsification is stopped, thereby preventing the unauthorized access by way of the falsification of the condition package 104.

The falsification check by the electronic signature is realized by the following method, for example. First, the condition package 104 is added with the information which is the condition package encrypted with a secret key. Second, in the user terminal 200, the added information is decrypted with a public key and the decrypted information is compared with the condition package 104. Finally, an occurrence of the falsification is known if a result of the comparison does not indicate a coincidence.

The above technique is detailed in the document "Applied Cryptography," Second Edition, Bruce Schneier, Jhon Wiley &Sons, Inc. ISBN-0-471-11709-9.

The information 102 is delivered to the user terminal 200 by the information provider 100 by way of one or more than one communication networks including Internet and/or other satellite communication networks or a storage medium such as a CD-ROM.

At the user terminal 200, the information 102 is stored in a memory section by way of a receiving set for signals coming from a network or a communication satellite or by way of a CD-ROM drive unit.

The information is provided with an identifier for the ease of control.

Now, the applicable time data shown in FIG. 3 will be described.

Referring to FIG. 3, it schematically illustrates the applicable time data including applicable time periods. It says that i) the decoded contents can be displayed at any time, ii) the decoded contents can be printed after 0 o'clock, Sep. 12, 1996, iii) the decoded contents can be stored after 0 o'clock, Sep. 14, 1996.

FIG. 4 schematically illustrates another applicable time data including applicable time periods. It will be appreciated that this is only a different expression of the table of FIG. 3. Symbols of ○ and x are used to indicate if each of the modes of utilization is authorized or not for use for the period specified there.

Various different formats may be conceivable to express the applicable time data.

Referring to FIG. 5A, a charge system may be added to the applicable time data of FIG. 4. Alternatively, the charge system may be so arranged as to correspond to the modes of utilization of information as shown in FIG. 5B. With such an arrangement, there may be provided a highly comprehensive charge system.

Thus, with this first embodiment, the applicable time data as illustrated in FIG. 3, FIG. 4, FIG. 5A, FIG. 5B or in some other format are contained in the condition package 104 of the information 102.

Thus, data such as "yes" or "no" for the displayability, the printability and the storability of the information may be omitted if such applicable time data is used.

Upon receiving a request from the user for displaying, printing and/or storing the information 102, the condition judging section 204 of the user terminal 200 judges if the request can be met or not by comparing for each requested mode of utilization the clock information read from the clock 206 (including the current time and the date in this embodiment) and the applicable time period for that mode of utilization specified in the applicable time data in the condition package 104 to determine if the contents of the information 102 are available for the requested mode of utilization.

If the condition judging section 204 determines that the contents of the information are available for the requested mode of utilization, it issues a command for action to the decoding section 208, 212 or 216, whichever appropriate, whereas it does not issue any command if it determines that the contents are not available. The decoding section 208, 212 or 216, whichever appropriate, carries out a predetermined processing operation only for the command for action it receives from the condition judging section 204.

Note that the plain contents obtained from the decoding section are not accessible from other than the processing section uniquely connected to that decoding section.

Each of the condition judging section 204, the clock 206, the decoding section 208, the display processing section 210, the decoding section 212, the printing processing section 214, the decoding section 216 and the storage processing section 218 in FIG. 2 may be realized either by means of software or by means of hardware. Note that each of these components is so configured that the user cannot modify any part thereof. Additionally, these components may be realized in a hermetically sealed unitary chip that cannot be damaged from outside.

If the clock 206 is provided as a piece of hardware, it may be realized in the form of an unreplaceable device that is initialized by the information provider 100.

Now, the operation of the embodiment will be described.

FIG. 6 is a flow chart of a processing operation when there is an occurrence of a request for an action at a user terminal.

When a request for an action that may be an action for displaying, printing or storing a specific piece of information provided by the information provider 100 is entered to a user terminal 200 by the user, the condition judging section 204 picks up the condition package 104 of the information 102 (step S11). Note that the condition package 104 contains "yes" or "no" for each mode of utilization so that the request is turned down at this step if the requested mode of utilization is not authorized at all.

The condition judging section 204 also reads the current time and date from clock 206 (step S12).

Note that step S12 may precede step S11 or steps S11 and S12 may be carried out concurrently.

Then, the condition judging section 204 judges if the requested action can be taken or not by comparing for each requested mode of utilization the current time and date read from the clock 206 and the applicable time period for that mode of utilization specified in the applicable time data in the condition package 104 to determine if the contents of the information 102 are available for the requested mode of utilization (step S13).

If it is determined in step S14 that the requested action (for display, printing or storage) can be taken, it issues a command for the action to the related decoding section (step S115). Note that, in this embodiment, a command is issued to the decoding section 208 for a displaying action, to the decoding section 212 for a printing action and/or to the decoding section 216 for a storing action.

Then, upon receiving a command, the decoding section decodes the encoded contents 106 and the related processing section outputs them to the related unit (step S16). More specifically, the plain contents are displayed on the display unit 230 by the display processing section 210, printed by the printing unit 240 under the control of the printing processing section 214 and/or stored in the external storage unit 250 by the external storage processing section 216.

If, on the other hand, it is determined in step S14 that the requested action is prohibited, the condition judging section 204 does not issue any command and the request is turned down.

Alternatively, if it is determined in step S14 that the requested action is prohibited, it may be so arranged that the condition judging section 204 issues a command prohibiting the requested action and a message saying "the requested action is prohibited at the requested time", to which the time period that allows the requested action to be taken may be added or not, is displayed to notify the user thereof.

Any known technique may be used for charging fees for the purpose of the present invention.

Thus, the above described embodiment can flexibly set requirements to be met by the user for utilizing the contents of a piece of information that can change the value and the mode of utilization with time as a function of the time and date of utilization.

For instance, it can prohibit the subscriber to print and/or store the contents of a news item when they have a value as news but permit him or her to do so in order to utilize them for a data base after a given period of time.

It may alternatively be so arranged for the above embodiment that the condition judging section 204 issues a command for an action to the display processing section 210, the printing processing section 214 and the storage processing section 218 simultaneously and only the relevant one or more than one of the display processing section 210, the printing processing section 214 and the storage processing section 218 operate for the specified action in response to the command issued from the condition judging section 204.

While a decoding section is provided for each of the modes of utilization in the above embodiment, a single decoding section may be shared by all the modes of utilization. With such an arrangement, again, the condition judging section 204 issues a command for an action to the display processing section 210, the printing processing section 214 and the storage processing section 218 simultaneously and only the relevant one or more than one of the display processing section 210, the printing processing section 214 and the storage processing section 218 operate for the specified action in response to the command issued from the condition judging section 204.

2nd Embodiment

While the first embodiment is designed to decode the encoded contents each time they are utilized, the time required for printing and/or storage can reduced when the contents decoded for display are used also for printing and/or storage and the operation of displaying the contents takes place prior to printing and/or storage.

The second embodiment is exactly designed to reduce the time required for printing and/or storage when the contents decoded for display are used also for printing and/or storage and the operation of displaying the contents takes place prior to printing and/or storage.

FIG. 7 is a schematic block diagram of an information distribution system.

As in the case of the first embodiment, the information distributed from the information provider 100 to each user terminal 300 includes a condition package 104 and encoded contents 106. The condition package 104 includes a description on the encoding system, a charging system, and applicable time data describing the applicable time period for each mode of utilization of the information. The applicable time data includes also "yes" or "no" for the displayability, the printability and the storability of the information respectively as in the case of conventional systems.

Note that the condition package 104 cannot be falsified by the user terminal 300.

It is possible to check to see if the condition package 104 has been falsified by adding an electronic signature or the like thereto. If a falsification is detected in this check, the access processing after the detection of the falsification is stopped, thereby preventing the unauthorized access by way of the falsification of the condition package 104.

The falsification check by the electronic signature is realized by the following method, for example. First, the condition package 104 is added with the information which is the condition package encrypted with a secret key. Second, in the user terminal 300, the added information is decrypted with a public key and the decrypted information is compared with the condition package 104. Finally, an occurrence of the falsification is known if a result of the comparison does not indicate a coincidence.

The information 102 is delivered to the user terminal 300 by the information provider 100 by way of one or more than one communication networks including Internet and/or other satellite communication networks or a storage medium such as a CD-ROM.

The information is provided with an identifier for the ease of control.

The applicable time data as described above by referring to the first embodiment are also used for this embodiment. More specifically, with this first embodiment, the applicable time data as illustrated in FIG. 3, FIG. 4, FIG. 5A, FIG. 5B or in some other format are contained in the condition package 104 of the information 102.

Thus, data such as "yes" or "no" for the displayability, the printability and the storability of the information may be omitted if the applicable time data is used.

Upon receiving a request from the user for displaying, printing and/or storing the information 102, (provided that the contents of the information are already displayed when an operation other than display is requested,) the condition judging section 304 of the user terminal 300 judges if the request can be met or not by comparing for each requested mode of utilization the clock information read from the clock 306 (including the current time and the date in this embodiment) and the applicable time period for that mode of utilization specified in the applicable time data in the condition package 104 to determine if the contents of the information 102 are available for the requested mode of utilization.

If the condition judging section 304 determines that the contents of the information are available for any of the requested modes of utilization, it issues a command for action to the decoding section 308 and the relevant one or more than one of the display processing section 312, the printing processing section 314 and the storage processing section 316, whereas it does not issue any command if it determines that the contents are not available. The decoding section 308 and the relevant one or ones of the display processing section 312, the printing processing section 314 and the storage processing section 316 carry out a predetermined processing operation only for the command for action they receive from the condition judging section 304.

Note that the plain contents obtained from the decoding section 308 are stored in the plain contents storage section 310 but are not accessible from other than the display processing section 312, the printing processing section 314 and the storage processing section 316.

Each of the condition judging section 304, the clock 306, the decoding section 308, the plain contents storage section 310, the display processing section 312, the printing processing section 314 and the storage processing section 316 described above may be realized either by means of software or by means of hardware. Note that each of these components is so configured that the user cannot modify any part thereof. Additionally, these components may be realized in a hermetically sealed unitary chip that cannot be damaged from outside.

If the clock 306 is provided as a piece of hardware, it may be realized in the form of an unreplaceable device that is initialized by the information provider 100.

Now, the operation of this second embodiment will be described.

FIG. 8 is a flow chart of a processing operation when there is an occurrence of a request for display at a user terminal.

When a request for display is entered to a user terminal 300 by the user, the condition judging section 304 picks up the condition package 104 of the information 102 (step S21).

The condition judging section 304 also reads the current time and date from clock 306 (step S22).

Note that step S22 may precede step S21 or steps S21 and S22 may be carried out concurrently.

Then, the condition judging section 304 judges if the requested displaying operation can be authorized at the current time by comparing the current time and date and the applicable time period for the display mode of utilization specified in the applicable time data in the condition package 104 to determine if the contents of the information 102 are available for the display mode of utilization (step S23).

If it is determined in step S24 that the requested display operation can be made, it issues a command for the operation to the decoding section 308 and the display processing section 312 (step S25).

Then, upon receiving a command, the decoding section 308 decodes the encoded contents 106 and the display processing section 312 outputs them to the display unit 330 for display (step S26).

If, on the other hand, it is determined in step S24 that the requested action is prohibited, the condition judging section 304 does not issue any command and the request is turned down.

Alternatively, if it is determined in step S24 that the requested action is prohibited, it may be so arranged that the condition judging section 304 issues a command prohibiting the requested action and a message saying "the requested action is prohibited at the requested time", to which the time period that allows the requested action to be taken may be added or not, is displayed to notify the user thereof.

Figure 9:
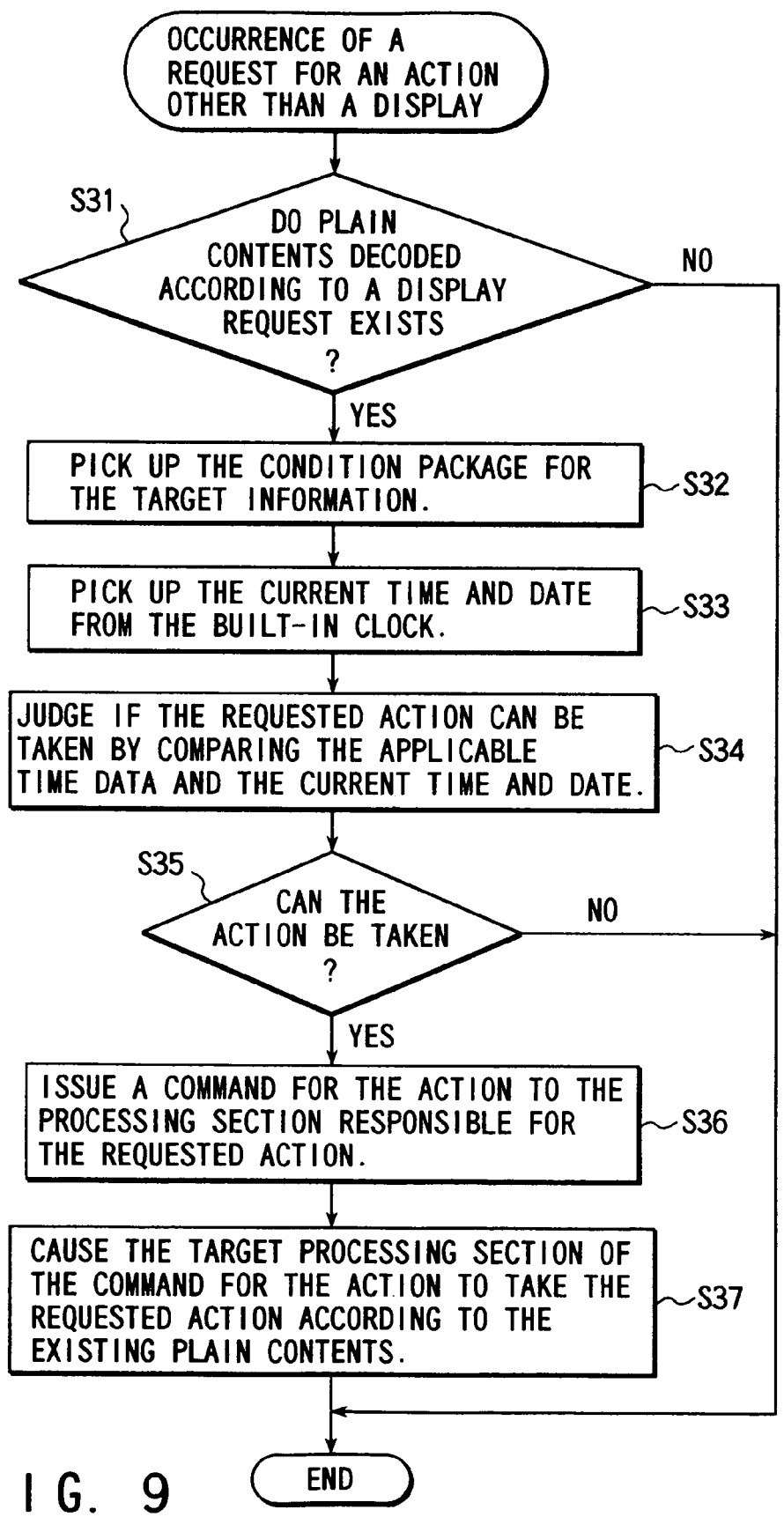
FIG. 9 is a flow chart of a processing operation that can be used for the second embodiment of the invention when there is an occurrence of a request for an action other than display at a user terminal.

FIG. 9 is a flow chart of a processing operation when there is an occurrence of a request for an action other than display at a user terminal.

When a request for an action other than display that may be a request for printing or storage is entered to a user terminal 300 by the user, the processing operation is terminated if it is found in step S31 that the operation for display has not been carried out yet and hence the plain contents to be utilized are not stored in the plain contents storage section 310. It may be so arranged that a message "no display" or "display first" is displayed to notify the user of the current situation.

If, on the other hand, it is found in step S31 that the operation for display has been carried out and hence the plain contents to be utilized are stored in the plain contents storage section 310, the condition judging section 304 picks up the condition package 104 of the information 102 to be utilized (step S32). If the condition package 104 contains "no" for the requested mode of utilization, the request is turned down at this time.

The condition judging section 304 also reads the current time and date from clock 306 (step S33).

Note that step S33 may precede step S32 or steps S32 and S33 may be carried out concurrently.

Then, the condition judging section 304 judges if the requested operation can be authorized at the current time by comparing the current time and date and the applicable time period for the requested mode of utilization specified in the applicable time data in the condition package 104 to determine if the contents of the information 102 are available for the requested mode of utilization (step S34).

If it is determined in step S35 that the requested operation can be made, it issues a command for the operation to the printing processing section 314 or the storage processing section 316, whichever appropriate (step S36).

Then, upon receiving a command, the processing section outputs the plain contents to the related unit 330 for display (step S37). Thus, the plain contents may be printed by the printing unit 340 under the control of the printing processing section 314 or stored in the external storage unit 350 by the storage processing section 316.

If, on the other hand, it is determined in step S35 that the requested action is prohibited, the condition judging section 304 does not issue any command and the request is turned down.

Alternatively, if it is determined in step S34 that the requested action is prohibited, it may be so arranged that the condition judging section 304 issues a command prohibiting the requested action and a message saying "the requested action is prohibited at the requested time", to which the time period that allows the requested action to be taken may be added or not, is displayed to notify the user thereof.

Figure 10:
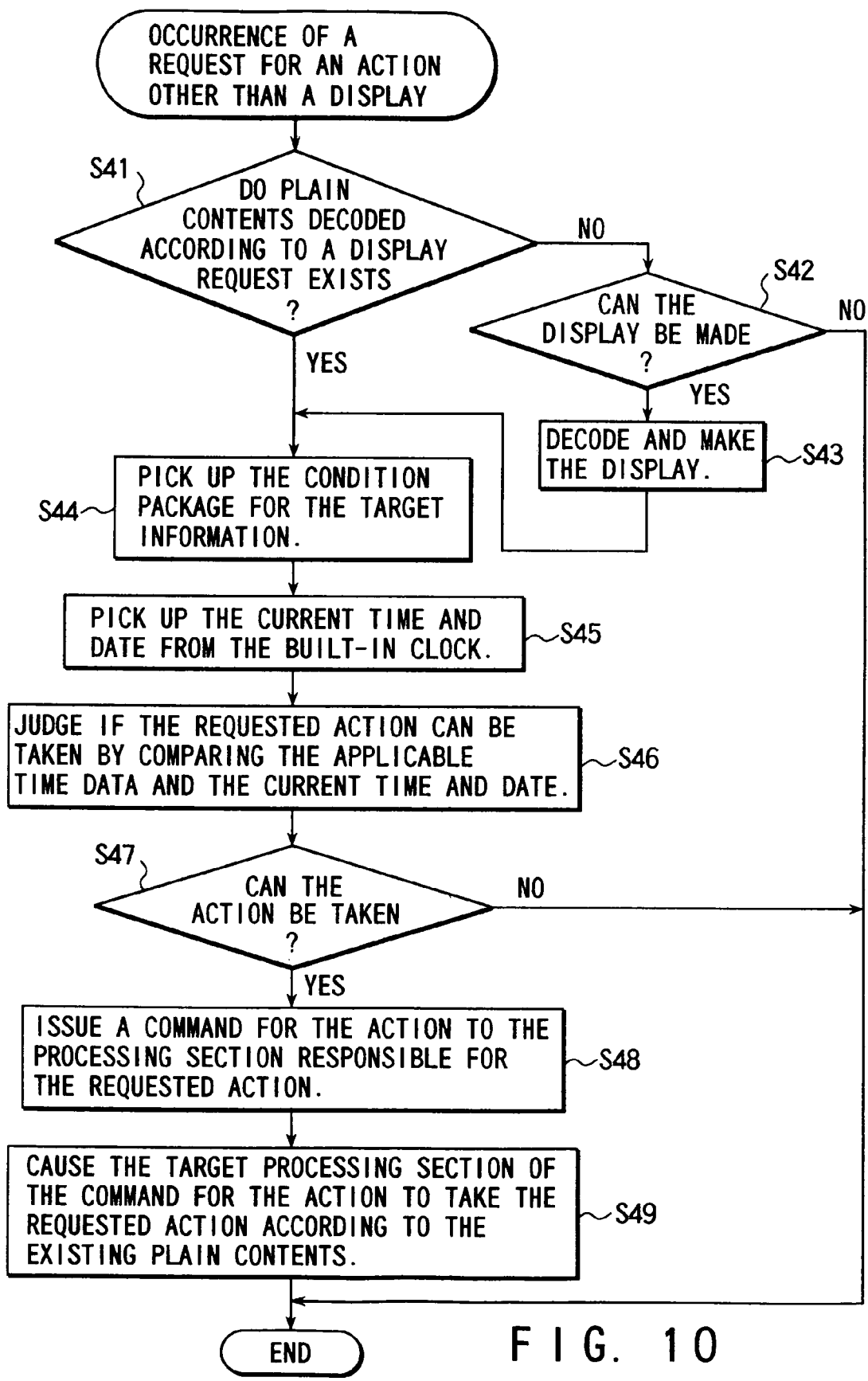
FIG. 10 is a flow chart of another processing operation that can be used for the second embodiment of the invention when there is an occurrence of a request for an action other than display at a user terminal.

FIG. 10 is a flow chart of an alternative processing operation when there is an occurrence of a request for an action other than display at a user terminal.

Only the difference between FIG. 9 and FIG. 10 will be described here.

According to FIG. 9, the processing operation is terminated if it is found in step S31 that the operation for display has not been carried out yet and hence the plain contents to be utilized are not stored in the plain contents storage section 310.

According to FIG. 10, on the other hand, the routines as described earlier by referring to FIG. 8 are carried out in steps S42 and S43 if it is found in step S41 that the operation for display has not been carried out yet and hence the plain contents to be utilized are not stored in the plain contents storage section 310 so that, if the plain contents can be displayed, the encoded contents are decoded and displayed automatically.

More specifically, in step S42, the condition judging section 304 picks up the condition package 104 of the target information 102 and also the current time and date from the clock 306 and judges if the requested operation can be authorized at the current time by comparing the current time and date and the applicable time period for the requested mode of utilization specified in the applicable time data in the condition package 104 to determine if the contents of the information 102 are available for the requested mode of utilization.

If it is determined in step S42 that the requested display operation can be made, it issues a command for the operation to the decoding section 308 and the display processing section 314 (step S43). As a result, the decoded contents are stored in the plain contents storage section 310 and displayed on the display unit 330. After step S43, the operation follows steps S44 through S49, which are identical with steps S32 through S37 described above.

If, on the other hand, it is determined in step S42 that the requested operation is prohibited, the condition judging section 304 does not issue any command and the request is turned down. Alternatively, the condition judging section 304 may issue a command for prohibiting the requested operation and a message saying "the requested display is prohibited at the requested time", to which the time period that allows the requested action to be taken may be added or not, is displayed to notify the user thereof.

While a display operation is carried out prior to any other mode of utilization in the above description of the second embodiment, step S31 may be omitted from FIG. 9 or steps S41 through S43 may be omitted from FIG. 10 if a display operation is not discriminated from the other modes of utilization. Then, the condition judging section 304 issues a command for an operation to the related processing section if there are no plain contents.

Any known technique may be used for charging fees for the purpose of the present invention.

Thus, the above described embodiment can flexibly set requirements to be met by the user for utilizing the contents of a piece of information that can change the value and the mode of utilization with time as a function of the time and date of utilization.

3rd Embodiment

Now, the third embodiment of the invention will be described.

A request for an action is turned down in the first embodiment if the requested action is not authorized at the current time and date.

This embodiment differs from the first one in that, if the requested action is not authorized at the current time and date, it stores the request if the requested action can be authorized sometime in the future so that the requested action is carried out automatically when the time comes where the request is authorized.

FIG. 11 is a schematic block diagram of an information distribution system.

The following description will be focused on the difference between the two embodiments and the components that are similar to or same as those of the first embodiment will not be described any further.

The system configuration of FIG. 11 differs from that of FIG. 2 in that a command memory 220 is provided in the third embodiment to store the commands for an action that is not authorized at the current time and date but can be authorized at some other time and date in the future, that a command from the condition judging section 204 is sent to a relevant one of the decoding sections and the corresponding processing section and that the clock information from the clock 206 are sent also to the command memory section 220.

The command memory section 220 operates for storing the commands for actions sent from the condition judging section 204 and hold them for the future. The command memory section 220 is provided with timers that correspond to the respective decoding sections 208, 212 and 216. Each of these timers is used to specify the time and date when the requested action is authorized so that it generates an timer event when a predetermined time period has elapsed. Once a timer event is generated, the command memory section 220 transmits the related command it stores for an action to the related decoding section (and the related processing section).

Each of the condition judging section 204, the clock 206, the decoding section 208, the display processing section 210, the decoding section 212, the printing processing section 214, the decoding section 216, the storage processing section 218 and the command memory section 220 described above may be realized either by means of software or by means of hardware. Note that each of these components is so configured that the user cannot modify any part thereof. Additionally, these components may be realized in a hermetically sealed unitary chip that cannot be damaged from outside.

If the clock 206 is provided as a piece of hardware, it may be realized in the form of an unreplaceable device that is initialized by the information provider 100 so that any other clock may not be used there.

Now, the operation of this third embodiment will be described by referring to the flow charts of FIGS. 12 and 13.

Figure 12:
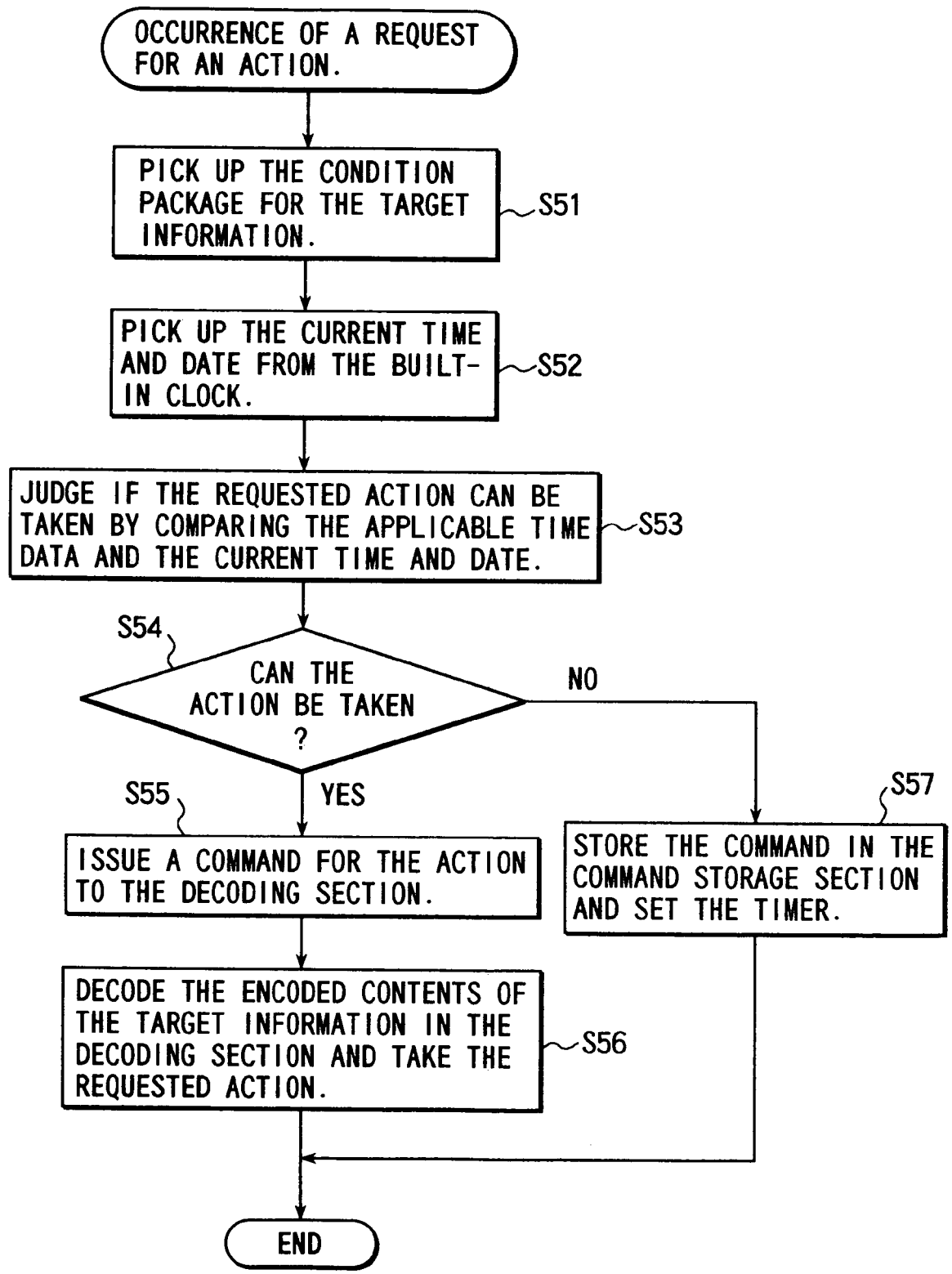
FIG. 12 is a flow chart of a processing operation that can be used for the third embodiment of the invention when there is an occurrence of a request for display at a user terminal.
Figure 13:
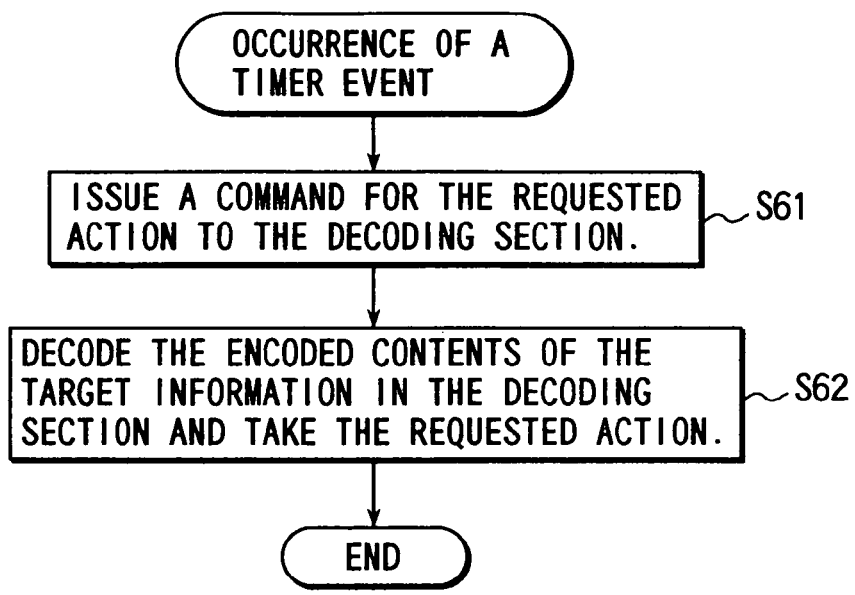
FIG. 13 is a flow chart of a processing operation that can be used for the third embodiment of the invention when there is an occurrence of a timer event at a user terminal.

In FIG. 12, steps S51 through S56 are identical with steps S11 through S16 of FIG. 6. In other words, if the requested action is authorized to be taken at the current time and date, it is carried out at steps S51 through S56.

Under this condition, the command memory section 220 sends a command for the action only to the related components and not to any other ones.

In step S54, if it is determined that the requested action is prohibited at the time and date of the request but there exits a time period during which the request can be authorized, the condition judging section 204 sends a control signal representing a command for the action that has to be reserved and data on the time and date when the request is authorized and hence the action can be taken to the command memory section 220. Note that the control signal representing a command for the action that has to be reserved may be replaced by the presence or absence of data on the time and date when the request for the action is authorized. The command memory section 220 stores the command for the action in the future and sets the timer for the time and date when the request for the action is authorized (step S57). It may be so arranged that a message saying that the request is reserved is displayed to notify the user thereof under this condition.

When the timer event occurs after the predetermined time period, the command memory section 220 sends the command for the action it stores to the related decoding section (and the related processing section) (step S61). Upon receiving the command for the action, the decoding section decodes the encoded contents to be utilized and the related processing section transmits a corresponding output to the unit connected to it (step S62).

Thus, this embodiment can store commands for an action that can be taken after a predetermined period of time from the current time and date so that the action can be taken when the predetermined time period has elapsed without requiring any further command to be issued by the user.

Assume that a user reads an article in a newspaper or a magazine and wants to store the contents of the article in his or her scrap book. When the user reads the article, it may most probably be authorized only for display and prohibited from being printed or stored. If the user cannot make an appointment for printing or storing the article at that time, it is very cumbersome and painstaking for him or her to read the article once again after a predetermined period of time to issue a request for printing or storage. He or she may have totally forgotten the article by that time. This embodiment can accommodate such situations to relieve the subscriber from the cumbersome and painstaking effort of memorizing the time and date when the request for printing and/or storing the article is authorized.

Since the appointment for storing the article can be automatically stored in the memory of the embodiment, the subscriber does not have to read the article for another time when he or she issues a request for storing it. Thus, the subscriber can enjoy preparing "a scrap book" by picking up only those contents he or she wants out of the contents provided by a pay-per-view system.

4th Embodiment

Now, the fourth embodiment of the invention will be described.

A request for an action is turned down in the second embodiment if the requested action is not authorized at the current time and date.

This embodiment differs from the second one in that, if the requested action is not authorized at the current time and date, it stores the request if the requested action can be authorized sometime in the future so that the requested action is carried out automatically when the time comes where the request is authorized.

FIG. 14 is a schematic block diagram of an information distribution system.

The following description will be focused on the difference between the two embodiments and the components that are similar to or same as those of the second embodiment will not be described any further.

The system configuration of FIG. 14 differs from that of FIG. 7 in that a command memory 320 is provided in the fourth embodiment to store the commands for an action that is not authorized at the current time and date but can be authorized at some other time and date in the future, that a command from the condition judging section 304 is sent to a relevant one of the decoding sections (and the corresponding processing section) and that the clock information from the clock 306 are sent also to the command memory section 320.

The command memory section 320 operates for storing the commands for actions sent from the condition judging section 304 and holds them for the future. The command memory section 320 is provided with a timer. The timer is used to specify the time and date when the decoding section 308 is authorized to decode the encoded contents for the requested action so that it generates a timer event when a predetermined time period has elapsed. Once a timer event is generated, the command memory section 320 transmits the related command it stores for an action to the decoding section 308 (and the related processing section).

Each of the condition judging section 304, the clock 306, the decoding section 308, the plain contents storage section 310, the display processing section 312, the printing processing section 314, the storage processing section 316 and the command memory section 320 described above may be realized either by means of software or by means of hardware. Note that each of these components are so configured that the user cannot modify any part thereof. Additionally, these components may be realized in the form a hermetically sealed unitary chip that cannot be damaged from outside.

If the clock 306 is provided as a piece of hardware, it may be realized in the form of an unreplaceable device that is initialized by the information provider 100 so that any other clock may not be used there.

Now, the operation of this fourth embodiment will be described by referring to the flow charts of FIGS. 15 through 17.

Figure 15:
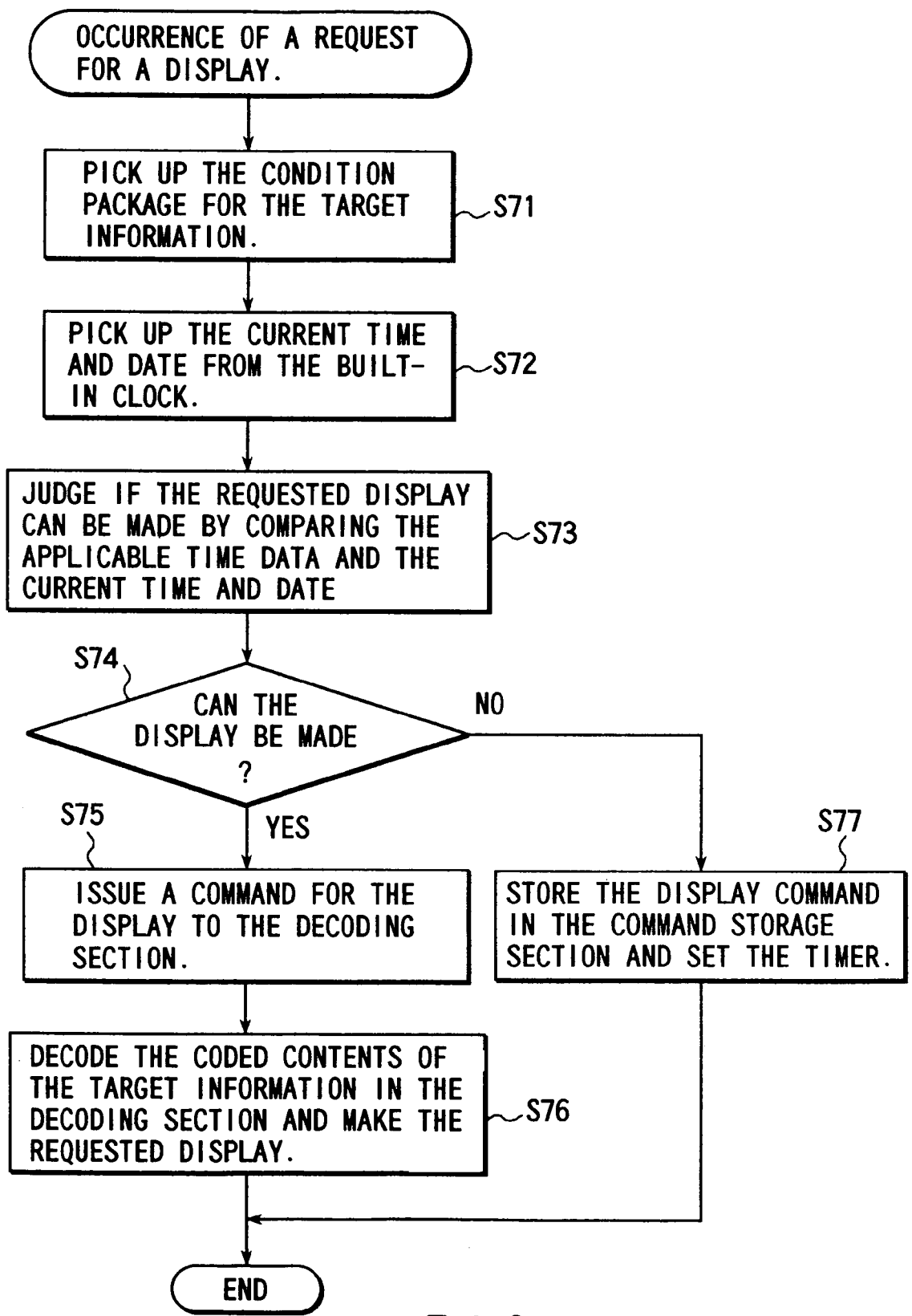
FIG. 15 is a flow chart of a processing operation that can be used for the fourth embodiment of the invention when there is an occurrence of a request for display at a user terminal.

FIG. 15 is a flow chart of a processing operation when there is an occurrence of a request for display at a user terminal. FIG. 16 is a flow chart of a processing operation when there is an occurrence of a request for an action other than display at a user terminal. FIG. 17 is a flow chart of a processing operation when there is an occurrence of a timer event at a user terminal.

Firstly, the operation of processing a request for display of this embodiment will be described by referring to the flow charts of FIG. 15.

In FIG. 15, steps S71 through S76 are identical with steps S21 through S26 of FIG. 8. In other words, if the requested action is authorized to be taken at the current time and date, it is carried out at steps S71 through S76.

Under this condition, the command memory section 320 sends a command for the action only to the related components and not to any other ones.

In step S74, if it is determined that the requested action is prohibited at the time and date of the request but there exits a time period during which the request can be authorized, the condition judging section 304 sends a control signal representing a command for the action that has to be reserved and data on the time and date when the request is authorized and hence the action can be taken to the command memory section 320. Note that the control signal representing a command for the action that has to be reserved may be replaced by the presence or absence of data on the time and date when the request for the action is authorized. The command memory section 320 stores the command for the action in the future and sets the timer for the time and date when the request for the action is authorized (step S77). It may be so arranged that a message saying that the request is reserved is displayed to notify the user thereof under this condition.

Figure 17:
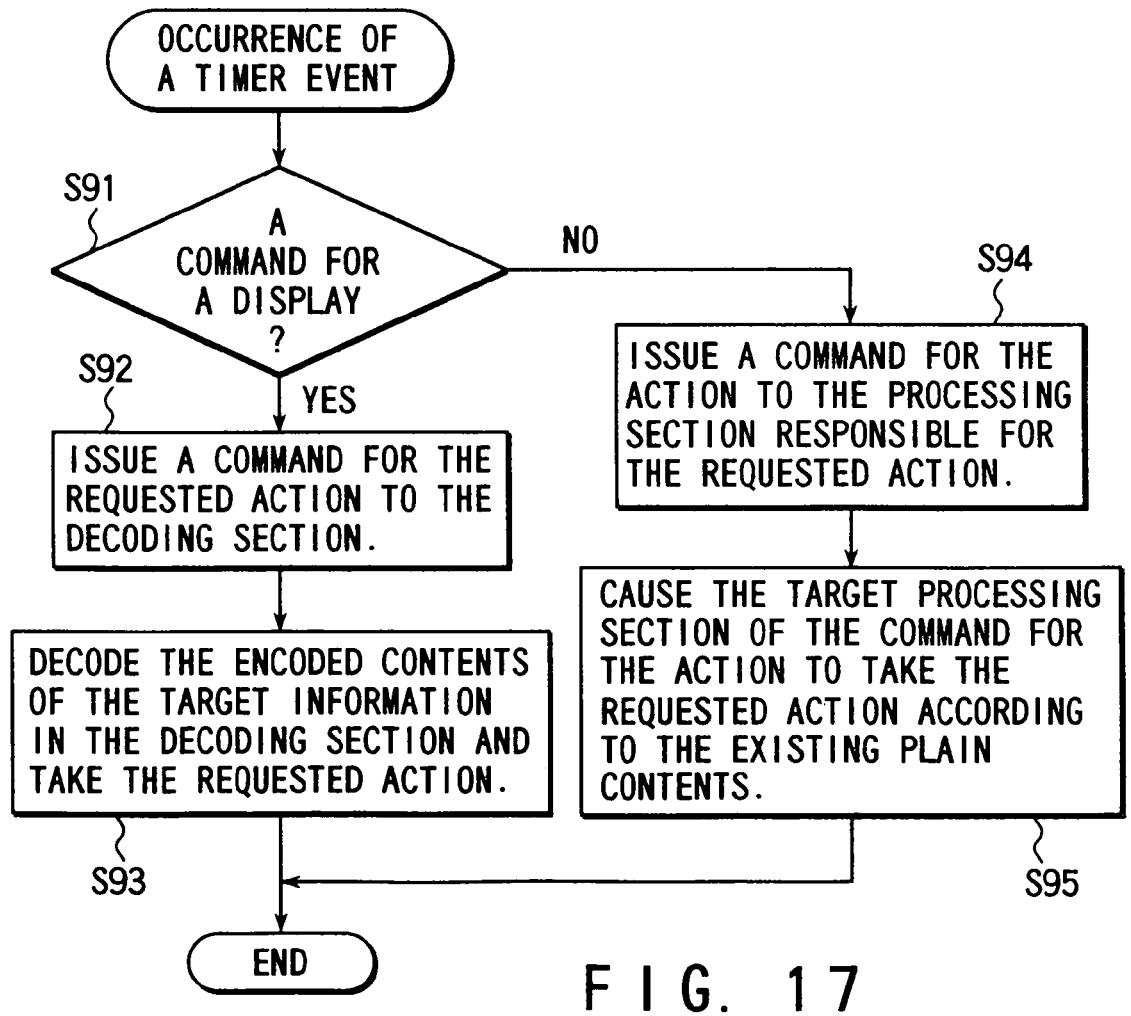
FIG. 17 is a flow chart of a processing operation that can be used for the fourth embodiment of the invention when there is an occurrence of a timer event at a user terminal.

When the timer event occurs after the predetermined time period and the requested action is a display operation (step S91) in FIG. 17, the command memory section 320 sends the command for the action it stores to the decoding section 308 and the display processing section 312 (step S92). Upon receiving the command for the action, the decoding section 308 decodes the encoded contents to be utilized and the display related processing section transmits a corresponding output to the unit connected to it (step S93).

Next, the operation of processing a request for other than display of this fourth embodiment will be described by referring to the flow charts of FIG. 16.

Figure 16:
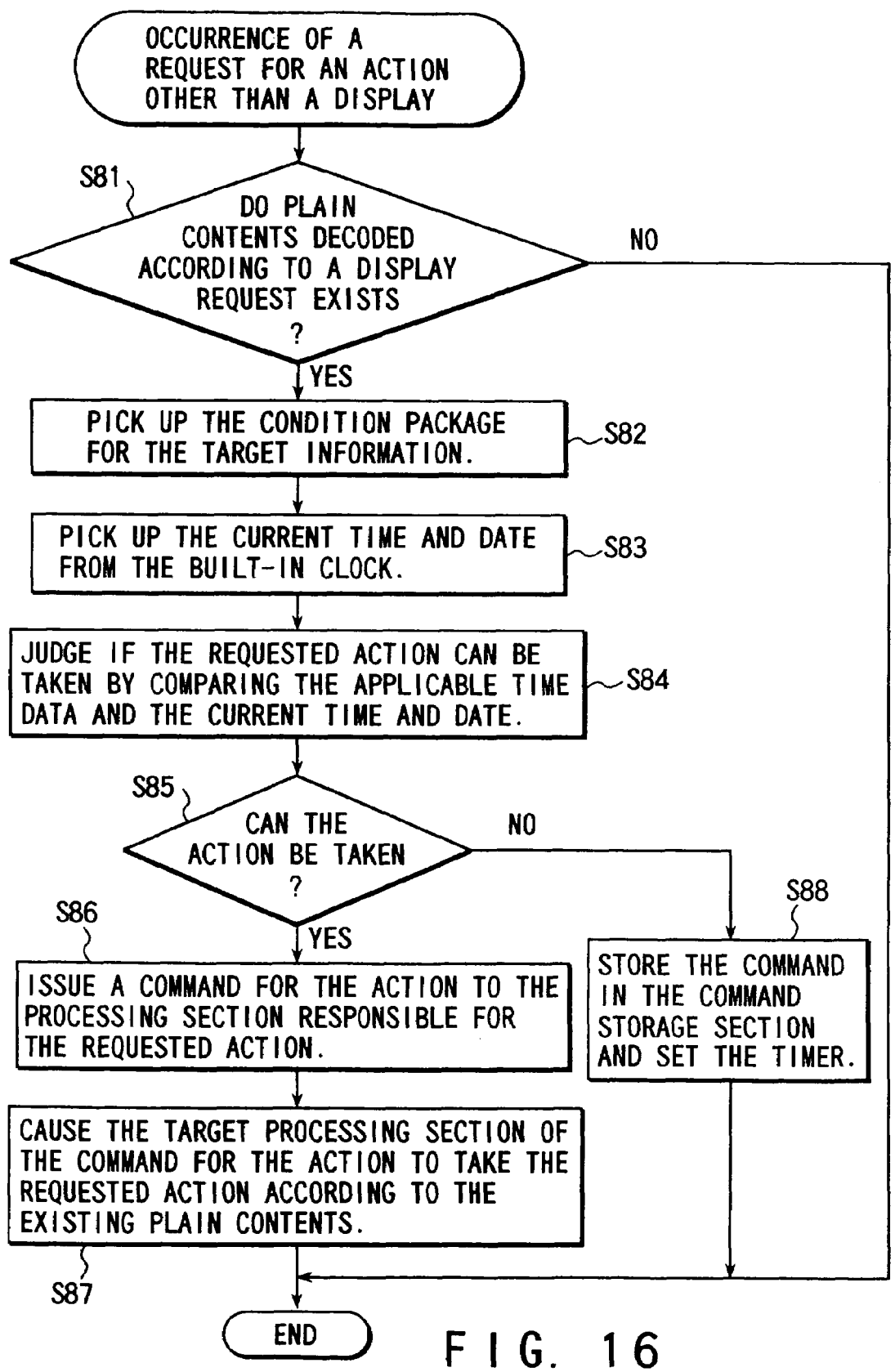
FIG. 16 is a flow chart of a processing operation that can be used for the fourth embodiment of the invention when there is an occurrence of a request for an action other than display at a user terminal.

In FIG. 16, steps S81 through S86 are identical with steps S31 through S36 of FIG. 9. In other words, if the requested action is authorized to be taken at the current time and date, it is carried out at steps S81 through S86.

Under this condition, the command memory section 320 of FIG. 14 sends a command for the action only to the related components and not to any other ones.

On the other hand, if it is determined in step S81 that the requested action is prohibited at the time and date of the request but there exits a time period during which the request can be authorized, the condition judging section 304 sends a control signal representing a command for the action that has to be reserved and data on the time and date when the request is authorized and hence the action can be taken to the command memory section 320 and sets the timer (step S88). As in the case of the third embodiment, it may be so arranged that a message saying that the request is reserved is displayed to notify the user thereof under this condition.

Referring further to FIG. 17, when the timer event occurs after the predetermined time period and if it is found (step S91) that the request is for other than display, the command memory section 320 sends the command for the action it stores to the related processing section, which may be the printing processing section 314 or the storage processing section 316 (step S94). Upon receiving the command for the action, the related processing section transmits a corresponding output to the unit connected to it on the basis of the plain contents decoded and stored in the plain contents storage section 310 (step S95).

If the command memory section 320 stores more than one command, it carries out the processing operation of FIG. 17 for each and all of the stored commands. It may be so arranged that a command for display is issued first if the same contents are reserved for both display and another mode of utilization at a same appointed time or two respective appointed times that are close to each other.

Figure 18:
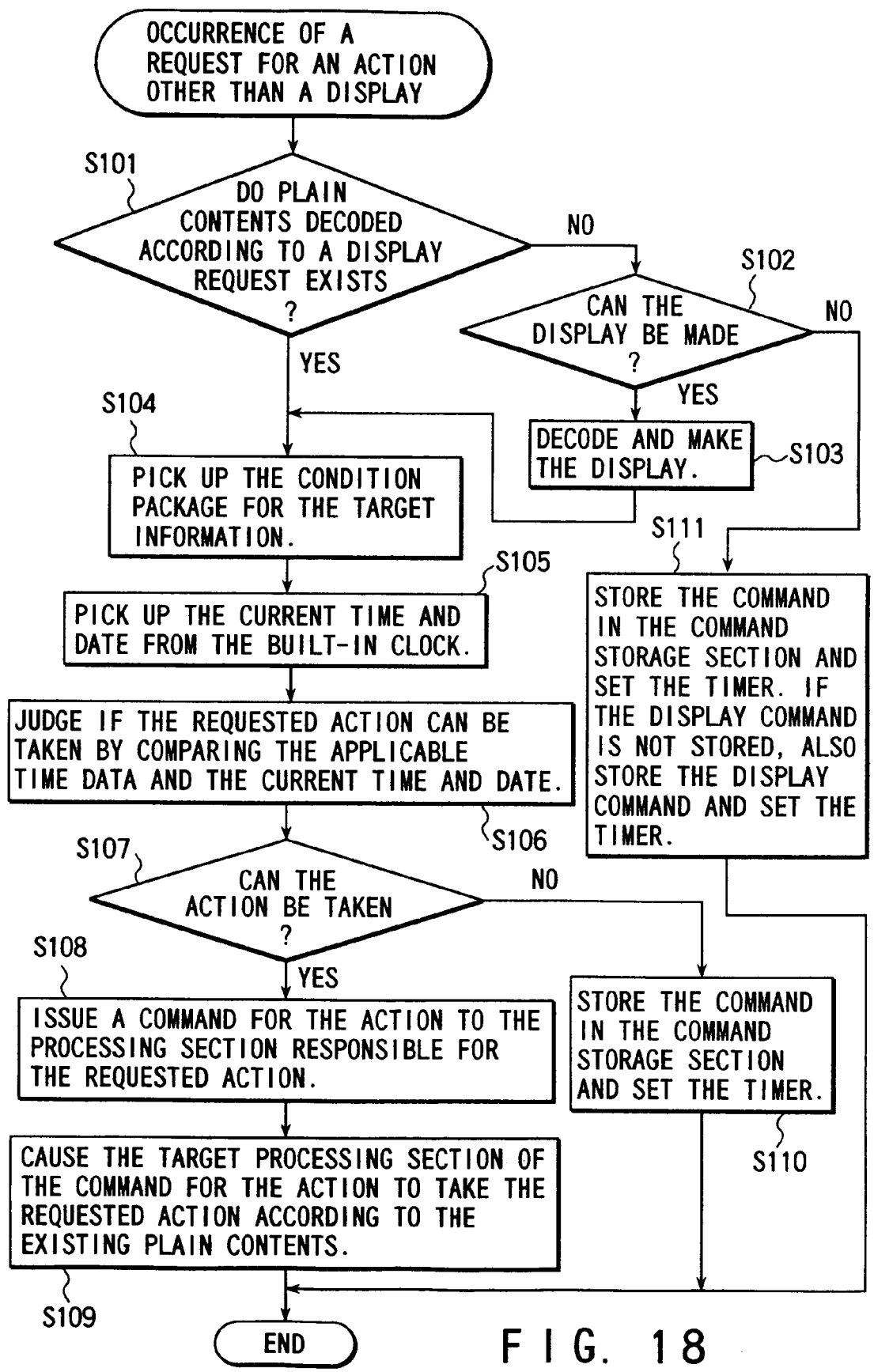
FIG. 18 is a flow chart of another processing operation that can be used for the fourth embodiment of the invention when there is an occurrence of a request for an action other than display at a user terminal.

FIG. 18 is a flow chart of another processing operation when there is an occurrence of a request for an action other than display at a user terminal.

In FIG. 18, steps S101 through S109 are identical with steps S41 through S49 of FIG. 10. In other words, if the requested action is authorized to be taken at the current time and date, it is carried out at steps S101 through S109. On the other hand, the routines as described earlier by referring to FIG. 8 are carried out in steps S42 and S43 if it is found in step S41 that the operation for display has not been carried out yet and hence the plain contents to be utilized are not stored in the plain contents storage section 310 so that, if the plain contents can be displayed, the encoded contents are decoded and displayed automatically.

Under this condition, the command memory section 320 of FIG. 14 sends a command for the action only to the related components and not to any other ones.

On the other hand, if it is determined in step S101 that there exists the requested plain contents, the condition judging section 304 sends a control signal representing a command for the action that has to be reserved and data on the time and date when the request is authorized and hence the action can be taken to the command memory section 320 and sets the timer (step S110) even though the requested action is prohibited at the time and date of the request but there exists a time period during which the request can be authorized. As described above, it may be so arranged that a message saying that the request is reserved be displayed to notify the user thereof under this condition.

If it is determined in step S101 that there do not exist any plain contents and the requested display operation is not authorized, the condition judging section 304 makes an appointment in the command memory section 320 for the requested action other than display and also for the requested display operation, if such a request exists (step S111).

When the timer event occurs after the predetermined time period, the processing steps are taken in a manner as described above by referring to FIG. 17. If the command memory section 320 stores more than one command as described above, it carries out the processing operation of FIG. 17 for each and all of the stored commands. It may be so arranged that a command for display is issued first if the same contents are reserved for both display and another mode of utilization at a same appointed time or two respective appointed times that are close to each other.

While a display operation is carried out prior to any other mode of utilization in the above description of the fourth embodiment, step S81 may be omitted from FIG. 16 or steps S101 through S103 and step S111 may be omitted from FIG. 18 if a display operation is not discriminated from the other modes of utilization. Then, it may be so arranged that the command memory section 320 stores only commands addressed to the processing sections and, if there do not exist any plain contents before issuing a command for a requested action to the related processing section, a same command is sent to the related decoding section.

Thus, the above described embodiment can flexibly set requirements to be met by the user for utilizing the contents of a piece of information that can change the value and the mode of utilization with time as a function of the time and date of utilization.

While the present invention has been described by way of several embodiments which provide modes of utilizing encoded contents including only display, printing and storage, many other modes of utilization may be conceivable.

Additionally, while the operation of any of the above described embodiments is controlled on the basis of the data on applicable time and date stored in condition package 104 and the current time and date available from the clock 206 (306), only data on dates may be used for controlling the operation.

For the purpose of the invention, the user terminal may be used as a server apparatus.

For example, the user terminal of any of the first through fourth embodiments may be connected to a user computer typically by way of LAN so that a request for display may be issued from the user computer to the user terminal by specifying the identifier of a piece of information. Upon receiving the request, the user terminal follows a set of processing steps as described above and transfers the display data to the user computer instead of sending them to the display unit of the terminal if the request is authorized (or when the time event for the reserved display operation occurs). The requesting user computer then outputs the received display data to the display unit. Of course, the display data cannot be decoded into plain contents. The above description may be applied to a request for printing as well.

It may alternatively be so arranged that, upon receiving a request for storage, the user terminal follows a set of processing steps as described above and transfers the plain contents corresponding to the request to the user computer instead of sending them to the storage unit of the terminal if the request is authorized any time thereafter (or a time comes when the request is authorized any time thereafter). The requesting user computer then stores the plain contents it receives. Since the use of the plain contents is authorized anytime thereafter, the user computer can utilize the plain contents it stores in any fashion.

Many other modifications of the above embodiments may be conceivable.

Alternatively, the user terminal of any of the first through fourth embodiments may be provided with the functional feature of a server.

While the present invention is described in terms of access right that can change with time. The fee to be charged for utilizing the contents of a piece of information may be changed with time according to the invention. If such is the case, a table showing the charge for any given time and date (or date) of utilization as illustrated in one of FIGS. 3 through 5B may be stored in advance so that the charge for a specified mode of utilization may be automatically calculated for a given time and date by a built-in charge processing section by referring to the table and the current time and date of the clock. Thus, an article of a newspaper or a magazine may be charged high for display at the day of issuance and a reduced rate will be charged from the next day and on.

A charging system as described above may be combined with any of the above described embodiments and their modifications. For example, a daily newspaper delivered on a subscription basis may be charged only for each issue of the day and may be stored for free of charge from the next day.

Note that any of the functions of the condition judging section, the clock, the decoding section, the plain contents storing section, the display processing section, the printing processing section and the storage processing section may be realized in the form of one or more than one computer programs (a group of program code instructions). Such a computer program may be stored in a storage medium (e.g., optical disc, magnetic disc, magneto-optical disc, semiconductor memory device) and read out of it and executed by means of a processing unit whenever necessary to control the access to any piece of information provided by the information provider.

As described above, according to the invention, there are provided an access control method and an information utilization apparatus that are adapted to have flexibility in setting charges and access requirements for the contents of information that can change the value and the mode of utilization with time.

According to the invention, the time for an access to the provided information may be appointed in advance so that the access may be realized without requiring any further command to be issued from the user.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

The invention claimed is:

1. An information utilization apparatus for requesting information for at least one of displaying, printing, or storing, wherein the accessibility of the information for each of the displaying, printing, or storing changes over time, determining the accessibility of the requested information for displaying, printing, or storing, and allowing displaying, printing, or storing of the requested information depending on the accessibility, comprising:
   a memory configured to store encoded first data and applicable time information which defines a plurality of modes of utilization of the first data and executable time periods of operations respectively corresponding to the plurality of modes of utilization, the plurality of modes of utilization including a display mode, a printing mode, and a storage mode, the applicable time information defining a displayable time period corresponding to the display mode, a printable time period corresponding to the printing mode, and a storable time period corresponding to the storage mode with respect to the first data;
   a display data decoding unit corresponding to the display mode and configured to decode the first data stored in the memory;
   a printing data decoding unit corresponding to the printing mode and configured to decode the first data stored in the memory;

a storage data decoding unit corresponding to the storage mode and configured to decode the first data stored in the memory;

a display processing unit corresponding to the display data decoding unit and configured to execute a display operation corresponding to the display mode using second data obtained from decoding of the first data;

a printing processing unit corresponding to the printing data decoding unit and configured to execute a printing operation corresponding to the printing mode using second data obtained from decoding of the first data;

a storage processing unit corresponding to the storage data decoding unit and configured to execute a storage operation corresponding to the storage mode using second data obtained from decoding of the first data;

a judging unit configured to judge if a requested operation is executable, upon a request entered via a user interface for an action for one of displaying, printing, and storing the first data, by reading the applicable time information from the memory and referring to an executable time period corresponding to a mode of utilization indicated by the request to compare with a current time;

an operation command issuing unit configured to issue a command for action to one of the display data decoding unit, the printing data decoding unit, and the storage data decoding unit, corresponding to the mode of utilization indicated by the request when the judging unit judges that the requested operation is executable; and a message issuing unit configured to issue a message indicating that a requested action is prohibited and indicating a time period that allows a requested action, the message being issued when the judging unit judges that the requested operation is not executable at a requested time, the time period that allows the requested action being acquired from the applicable time information stored in the memory.

2. The apparatus according to claim 1, wherein execution of the printing operation and execution of the storage operation are prohibited until a certain period of time passes and permitted after the certain period of time passes.

3. An information utilization apparatus for requesting information for at least one of displaying, printing, or storing, wherein the accessibility of the information for each of the displaying, printing, or storing changes over time, determining the accessibility of the requested information for displaying, printing, or storing, and allowing displaying, printing, or storing of the requested information depending on the accessibility, comprising:

a memory configured to store encoded first data and applicable time information which defines a plurality of modes of utilization of the first data and executable time periods of operations respectively corresponding to the plurality of modes of utilization, the plurality of modes of utilization including a display mode, a printing mode, and a storage mode, the applicable time information defining a displayable time period corresponding to the display mode, a printable time period corresponding to the printing mode, and a storable time period corresponding to the storage mode with respect to the first data;

a decoding unit configured to decode the first data stored in the memory;

a data storage unit configured to store second data obtained from decoding the first data;

a display processing unit configured to execute a display operation corresponding to the display mode using second data stored in the data storage unit;

a printing processing unit configured to execute a printing operation corresponding to the printing mode using second data stored in the data storage unit;

a storage processing unit configured to execute a storage operation corresponding to the storage mode using second data stored in the data storage unit;

a judging unit configured to judge if a requested operation is executable, upon a request entered via a user interface for an action for one of displaying, printing, and storing the first data, by reading the applicable time information from the memory and referring to an executable time period corresponding to a mode of utilization indicated by the request to compare with a current time;

an operation command issuing unit configured to issue commands for actions to the decoding unit and one of the display processing unit, the printing processing unit, and the storage processing unit, corresponding to the mode of utilization indicated by the request if the second data is not stored in the data storage unit and configured to issue a command for action to one of the display processing unit, the printing processing unit, and the storage processing unit, corresponding to the mode of utilization indicated by the request if the second data is stored in the data storage unit when the judging unit judges that the requested operation is executable; and a message issuing unit configured to issue a message indicating that a requested action is prohibited and indicating a time period that allows a requested action, the message being issued when the judging unit judges that the requested operation is not executable at a requested time, the time period that allows the requested action being acquired from the applicable time information stored in the memory.

4. The apparatus according to claim 3, wherein execution of the printing operation and execution of the storage operation are prohibited until a certain period of time passes and permitted after the certain period of time passes.

5. An information utilization apparatus for requesting information for at least one of displaying, printing, or storing, wherein the accessibility of the information for each of the displaying, printing, or storing changes over time, determining the accessibility of the requested information for displaying, printing, or storing, and allowing displaying, printing, or storing of the requested information depending on the accessibility comprising:

a memory configured to store encoded first data and applicable time information which defines a plurality of modes of utilization of the first data and executable time periods of operations respectively corresponding to the plurality of modes of utilization, the plurality of modes of utilization including a display mode, a printing mode, and a storage mode, the applicable time information defining a displayable time period corresponding to the display mode, a printable time period corresponding to the printing mode, and a storable time period corresponding to the storage mode with respect to the first data;

a display data decoding unit corresponding to the display mode and configured to decode the first data stored in the memory;

a printing data decoding unit corresponding to the printing mode and configured to decode the first data stored in the memory;

a storage data decoding unit corresponding to the storage mode and configured to decode the first data stored in the memory;

a display processing unit corresponding to the display data decoding unit and configured to execute a display operation corresponding to the display mode using second data obtained from decoding of the first data;

a printing processing unit corresponding to the printing data decoding unit and configured to execute a printing operation corresponding to the printing mode using second data obtained from decoding of the first data;

a storage processing unit corresponding to the storage data decoding unit and configured to execute a storage operation corresponding to the storage mode using second data obtained from decoding of the first data;

a judging unit configured to judge if a requested operation is executable, upon a request entered via a user interface for an action for one of displaying, printing, and storing the first data, by reading the applicable time information from the memory and referring to an executable time period corresponding to a mode of utilization indicated by the request to compare with a current time;

an operation command issuing unit configured to issue a command for action to one of the display data decoding unit, the printing data decoding unit, and the storage data decoding unit, corresponding to the mode of utilization indicated by the request in a case where the judging unit judges that the requested operation is executable;

an operation command reserving unit configured to prevent the issuance of the command to the one of the display data decoding unit, the printing data decoding unit, and the storage data decoding unit until a current time reaches the executable time period when the judging unit does not judge that the requested operation is executable; and a message issuing unit configured to issue a message indicating that a requested action is prohibited and indicating a time period that allows a requested action, the message being issued when the judging unit judges that the requested operation is not executable at a requested time, the time period that allows the requested action being acquired from the applicable time information stored in the memory.

6. The apparatus according to claim 5, wherein execution of the printing operation and execution of the storage operation are prohibited until a certain period of time passes and permitted after the certain period of time passes.

7. An information utilization apparatus for requesting information for at least one of displaying, printing, or storing, wherein the accessibility of the information for each of the displaying, printing, or storing changes over time, determining the accessibility of the requested information for displaying, printing, or storing, and allowing displaying, printing, or storing of the requested information depending on the accessibility, comprising:

a memory configured to store encoded first data and applicable time information which defines a plurality of modes of utilization of the first data and executable time periods of operations respectively corresponding to the plurality of modes of utilization, the plurality of modes of utilization including a display mode, a printing mode, and a storage mode, the applicable time information defining a displayable time period corresponding to the display mode, a printable time period corresponding to the printing mode, and a storable time period corresponding to the storage mode with respect to the first data;

a decoding unit configured to decode the first data stored in the memory;

a data storage unit configured to store second data obtained from decoding the first data;

a display processing unit configured to execute a display operation corresponding to the display mode using second data stored in the data storage unit;

a printing processing unit configured to execute a printing operation corresponding to the printing mode using second data stored in the data storage unit;

a storage processing unit configured to execute a storage operation corresponding to the storage mode using second data stored in the data storage unit;

a judging unit configured to judge if a requested operation is executable, upon a request entered via a user interface for an action for one of displaying, printing, and storing the first data, by reading the applicable time information from the memory and referring to an executable time period corresponding to a mode of utilization indicated by the request to compare with a current time;

an operation command issuing unit configured to issue commands for actions to the decoding unit and one of the display processing unit, the printing processing unit, and the storage processing unit, corresponding to the mode of utilization indicated by the request if the second data is not stored in the data storage unit and configured to issue a command for action to one of the display processing unit, the printing processing unit, and the storage processing unit, corresponding to the mode of utilization indicated by the request if the second data is stored in the data storage unit when the judging unit judges that the requested operation is executable;

an operation command reserving unit configured to prevent the issuance of the command to the decoding unit until a current time reaches the executable time period when the judging unit does not judge that the requested operation is executable; and a message issuing unit configured to issue a message indicating that a requested action is prohibited and indicating a time period that allows a requested action, the message being issued when the judging unit judges that the requested operation is not executable at a requested time, the time period that allows the requested action being acquired from the applicable time information stored in the memory.

8. The apparatus according to claim 7, wherein execution of the printing operation and execution of the storage operation are prohibited until a certain period of time passes and permitted after the certain period of time passes.

9. An information access control method for use in an information utilization apparatus for requesting information for at least one of displaying, printing, or storing, wherein the accessibility of the information for each of the displaying, printing, or storing changes over time, determining the accessibility of the requested information for displaying, printing, or storing, and allowing displaying, printing, or storing of the requested information depending on the accessibility, the apparatus having a memory which stores information including encoded first data, the method comprising:

storing, in the memory, the first data encoded and applicable time information which defines a plurality of modes of utilization of the first data and executable time periods of operations respectively corresponding to the plurality of modes of utilization, the plurality of modes of utilization including a display mode, a printing mode, and a storage mode, the applicable time information defining a displayable time period corresponding to the display mode, a printable time period corresponding to the printing mode, and a storable time period corresponding to the storage mode with respect to the first data;

judging if a requested operation is executable, upon a request entered via a user interface for an action for one of displaying, printing, and storing the first data, by reading the applicable time information from the memory and referring to an executable time period corresponding to a mode of utilization indicated by the request to compare with a current time;

decoding the first data stored in the memory by one of a display data decoding unit, a printing data decoding unit, and a storage data decoding unit, corresponding to the mode of utilization indicated by the request when the judgment indicates that the requested operation is executable, the display data decoding unit, the printing data decoding unit, and the storage data decoding unit being provided respectively corresponding to the display mode, the printing mode, and the storage mode;

executing the requested operation using second data obtained from decoding the first data by one of a display processing unit, a printing processing unit, and a storage processing unit, corresponding to the mode of utilization indicated by the request, the display processing unit, the printing processing unit, and the storage processing unit respectively corresponding to the display data decoding unit, the printing data decoding unit, and the storage data decoding unit; and in a case where the judgment indicates that the requested operation is not executable at a requested time, issuing a message indicating that a requested action is prohibited and indicating a time period that allows a requested action, the time period that allows the requested action being acquired from the applicable time information stored in the memory.

10. The method according to claim 9, wherein execution of the printing operation and execution of the storage operation are prohibited until a certain period of time passes and permitted after the certain period of time passes.

11. An information access control method for use in an information utilization apparatus for requesting information for at least one of displaying, printing, or storing, wherein the accessibility of the information for each of the displaying, printing, or storing changes over time, determining the accessibility of the requested information for displaying, printing, or storing, and allowing displaying, printing, or storing of the requested information depending on the accessibility, the apparatus having a memory which stores information including encoded first data, the method comprising:

storing, in the memory, the encoded first data and applicable time information which defines a plurality of modes of utilization of the first data and executable time periods of operations respectively corresponding to the plurality of modes of utilization, the plurality of modes of utilization including a display mode, a printing mode, and a storage mode, the applicable time information defining a displayable time period corresponding to the display mode, a printable time period corresponding to the printing mode, and a storable time period corresponding to the storage mode with respect to the first data;

judging if a requested operation is executable, upon a request entered via a user interface for an action for one of displaying, printing, and storing the first data, by reading the applicable time information from the memory and referring to an executable time period corresponding to a mode of utilization indicated by the request to compare with a current time;

decoding the first data stored in the memory by a decoding unit when the judgment indicates that the requested operation is executable;

storing, in a data storage unit, second data obtained from decoding the first data;

executing the requested operation using the second data stored in the data storage unit by one of a display processing unit, a printing processing unit, and a storage processing unit, corresponding to the mode of utilization indicated by the request, the display processing unit, the printing processing unit, and the storage processing unit respectively corresponding to the display mode, the printing mode, and the storage mode;

executing another requested operation using the second data stored in the data storage unit, upon another request for operation execution, by one of the display processing unit, the printing processing unit, and the storage processing unit, corresponding to a mode of utilization indicated by another request in a case where the judgment indicates that the another requested operation is executable; and in a case where the judgment indicates that the requested operation is not executable at a requested time, issuing a message indicating that a requested action is prohibited and indicating a time period that allows a requested action, the time period that allows the requested action being acquired from the applicable time information stored in the memory.

12. The method according to claim 11, wherein execution of the printing operation and execution of the storage operation are prohibited until a certain period of time passes and permitted after the certain period of time passes.

13. An information access control method for use in an information utilization apparatus for requesting information for at least one of displaying, printing, or storing, wherein the accessibility of the information for each of the displaying, printing, or storing changes over time, determining the accessibility of the requested information for displaying, printing, or storing, and allowing displaying, printing, or storing of the requested information depending on the accessibility, the apparatus having a memory which stores information including encoded first data, the method comprising:

storing, in the memory, the encoded first data and applicable time information which defines a plurality of modes of utilization of the first data and executable time periods of operations respectively corresponding to the plurality of modes of utilization, the plurality of modes of utilization including a display mode, a printing mode, and a storage mode, the applicable time information defining a displayable time period corresponding to the display mode, a printable time period corresponding to the printing mode, and a storable time period corresponding to the storage mode with respect to the first data;

judging if a requested operation is executable, upon a request entered via a user interface for an action for one of displaying, printing, and storing the first data, by reading the applicable time information from the memory and referring to an executable time period corresponding to a mode of utilization indicated by the request to compare with a current time;

decoding the first data stored in the memory by one of a display data decoding unit, a printing data decoding unit, and a storage data decoding unit, corresponding to the mode of utilization indicated by the request when the judgment indicates that the requested operation is executable, the display data decoding unit, the printing data decoding unit, and the storage data decoding unit respectively corresponding to the display mode, the printing mode, and the storage mode;

preventing the decoding of the first data until a current time reaches the executable time period in a case where the judgment does not indicate that the requested operation is executable, and decoding the first data by the decoding unit corresponding to the mode of utilization indicated by the request after a current time reaches the executable time period;

executing the requested operation using second data obtained from decoding the first data by one of a display processing unit, a printing processing unit, and a storage processing unit, corresponding to the mode of utilization indicated by the request, the display processing unit, the printing processing unit, and the storage processing unit respectively corresponding to the display data decoding unit, the printing data decoding unit, and the storage data decoding unit; and in a case where the judgment indicates that the requested operation is not executable at a requested time, issuing a message indicating that a requested action is prohibited and indicating a time period that allows a requested action, the time period that allows the requested action being acquired from the applicable time information stored in the memory.

14. The method according to claim 13, wherein execution of the printing operation and execution of the storage operation are prohibited until a certain period of time passes and permitted after the certain period of time passes.

15. An information access control method for use in an information utilization apparatus for requesting information for at least one of displaying, printing, or storing, wherein the accessibility of the information for each of the displaying, printing, or storing changes over time, determining the accessibility of the requested information for displaying, printing, or storing, and allowing displaying, printing, or storing of the requested information depending on the accessibility, the apparatus having a memory which stores information including encoded first data, the method comprising:

storing, in the memory, the encoded first data and applicable time information which defines a plurality of modes of utilization of the first data and executable time periods of operations respectively corresponding to the plurality of modes of utilization, the plurality of modes of utilization including a display mode, a printing mode, and a storage mode, the applicable time information defining a displayable time period corresponding to the display mode, a printable time period corresponding, to the printing mode, and a storable time period corresponding to the storage mode with respect to the first data;

judging if a requested operation is executable, upon a request entered via a user interface for an action for one of displaying, printing, and storing the first data, by reading the applicable time information from the memory and referring to an executable time period corresponding to a mode of utilization indicated by the request to compare with a current time;

decoding the first data stored in the memory by a decoding unit when the judgment indicates that the requested operation is executable;

preventing the decoding of the first data until a current time reaches the executable time period when the judgment does not indicate that the requested operation is executable, and decoding the first data by the decoding unit corresponding to the mode of utilization indicated by the request after a current time reaches the executable time period;

storing, in a data storage unit, second data obtained from decoding the first data;

executing the requested operation using the second data stored in the data storage unit by one of a display processing unit, a printing processing unit, and a storage processing unit, corresponding to the mode of utilization indicated by the request, the display processing unit, the printing processing unit, and the storage processing unit respectively corresponding to the display mode, the printing mode, and the storage mode;

executing another requested operation using the second data stored in the data storage unit, upon another request for operation execution, by one of the display processing unit, the printing processing unit, and the storage processing unit, corresponding to a mode of utilization indicated by another request, when the judgment indicates that the another requested operation is executable or after a current time reaches the executable time period when the judgment does not indicate that the another requested operation is executable; and in a case where the judgment indicates that the requested operation is not executable at a requested time, issuing a message indicating that a requested action is prohibited and indicating a time period that allows a requested action, the time period that allows the requested action being acquired from the applicable time information stored in the memory.

16. The method according to claim 15, wherein execution of the printing operation and execution of the storage operation are prohibited until a certain period of time passes and permitted after the certain period of time passes.

17. A storage medium having program code instructions stored thereon which perform information access control when executed by a processor in an information utilization apparatus for requesting information for at least one of displaying, printing, or storing, wherein the accessibility of the information for each of the displaying, printing, or storing changes over time, determining the accessibility of the requested information for displaying, printing, or storing, and allowing displaying, printing, or storing of the requested information depending on the accessibility, the apparatus having a memory which stores information including encoded first data, the instructions comprising:

storing, in the memory, the encoded first data and applicable time information which defines a plurality of modes of utilization of the first data and executable time periods of operations respectively corresponding to the plurality of modes of utilization the plurality of modes of utilization including a display mode, a printing mode, and a storage mode, the applicable time information defining a displayable time period corresponding to the display mode, a printable time period corresponding to the printing mode, and a storable time period corresponding to the storage mode with respect to the first data;

judging if a requested operation is executable, upon a request entered via a user interface for an action for one of displaying, printing, and storing the first data, by reading the applicable time information from the memory and referring to an executable time period corresponding to a mode of utilization indicated by the request to compare with a current time;

decoding the first data stored in the memory by one of a display data decoding unit, a printing data decoding unit, and a storage data decoding unit, corresponding to the mode of utilization indicated by the request when the judgment indicates that the requested operation is executable, the display data decoding unit, the printing data decoding unit, and the storage data decoding unit respectively corresponding to the display mode, the printing mode, and the storage mode;

executing the requested operation using second data obtained from decoding the first data by one of a display processing unit, a printing processing unit, and a storage processing unit, corresponding to the mode of utilization indicated by the request, the display processing unit, the printing processing unit, and the storage processing unit respectively corresponding to the display data decoding unit, the printing data decoding unit, and the storage data decoding unit; and in a case where the judgment indicates that the requested operation is not executable at a requested time, issuing a message indicating that a requested action is prohibited and indicating a time period that allows a requested action, the time period that allows the requested action being acquired from the applicable time information stored in the memory.

18. The storage medium according to claim 17, wherein execution of the printing operation and execution of the storage operation are prohibited until a certain period of time passes and permitted after the certain period of time passes.

19. A storage medium having program code instructions stored thereon which perform information access control when executed by a processor in an information utilization apparatus for requesting information for at least one of displaying, printing, or storing, wherein the accessibility of the information for each of the displaying, printing, or storing changes over time, determining the accessibility of the requested information for displaying, printing, or storing, and allowing displaying, printing, or storing of the requested information depending on the accessibility, the apparatus having a memory which stores information including encoded first data, the instructions comprising:

storing, in the memory, the encoded first data and applicable time information which defines a plurality of modes of utilization of the first data and executable time periods of operations respectively corresponding to the plurality of modes of utilization, the plurality of modes of utilization including a display mode, a printing mode, and a storage mode, the applicable time information defining a displayable time period corresponding to the display mode, a printable time period corresponding to the printing mode, and a storable time period corresponding to the storage mode with respect to the first data;

judging if a requested operation is executable, upon a request entered via a user interface for an action for one of displaying, printing, and storing the first data, by reading the applicable time information from the memory and referring to an executable time period corresponding to a mode of utilization indicated by the request to compare with a current time;

decoding the first data stored in the memory by a decoding unit when the judgment indicates that the requested operation is executable;

storing, in a data storage unit, second data obtained from decoding the first data;

executing the requested operation using the second data stored in the data storage unit by one of a display processing unit, a printing processing unit, and a storage processing unit, corresponding to the mode of utilization indicated by the request, the display processing unit, the printing processing unit, and the storage processing unit respectively corresponding to the display mode, the printing mode, and the storage mode;

executing another requested operation using the second data stored in the data storage unit, upon another request for operation execution, by one of the display processing unit, the printing processing unit, and the storage processing unit, corresponding to a mode of utilization indicated by another request when the judgment indicates that the another requested operation is executable; and in a case where the judgment indicates that the requested operation is not executable at a requested time, issuing a message indicating that a requested action is prohibited and indicating a time period that allows a requested action, the time period that allows the requested action being acquired from the applicable time information stored in the memory.

20. The storage medium according to claim 19, wherein execution of the printing operation and execution of the storage operation are prohibited until a certain period of time passes and permitted after the certain period of time passes.

21. A storage medium having program code instructions stored thereon which perform information access control when executed by a processor in an information utilization apparatus for requesting information for at least one of displaying, printing, or storing, wherein the accessibility of the information for each of the displaying, printing, or storing changes over time, determining the accessibility of the requested information for displaying, printing, or storing, and allowing displaying, printing, or storing of the requested information depending on the accessibility, the apparatus having a memory which stores information including encoded first data, the instructions comprising:

storing, in the memory, the encoded first data and applicable time information which defines a plurality of modes of utilization of the first data and executable time periods of operations respectively corresponding to the plurality of modes of utilization, the plurality of modes of utilization including a display mode, a printing mode, and a storage mode, the applicable time information defining a displayable time period corresponding to the display mode, a printable time period corresponding to the printing mode, and a storable time period corresponding to the storage mode with respect to the first data;

judging if a requested operation is executable, upon a request entered via a user interface for an action for one of displaying, printing, and storing the first data, by reading the applicable time information from the memory and referring to an executable time period corresponding to a mode of utilization indicated by the request to compare with a current time;

decoding the first data stored in the memory by one of a display data decoding unit, a printing data decoding unit, and a storage data decoding unit, corresponding to the mode of utilization indicated by the request in a case where the judgment indicates that the requested operation is executable, the display data decoding unit, the printing data decoding unit, and the storage data decoding unit respectively corresponding to the display mode, the printing mode, and the storage mode;

preventing the decoding of the first data until a current time reaches the executable time period in a case where the judgment does not indicate that the requested operation is executable, and decoding the first data by the decoding unit corresponding to the mode of utilization indicated by the request after a current time reaches the executable time period;

executing the requested operation using second data obtained from decoding the first data by one of a display processing unit, a printing processing unit, and a storage processing unit, corresponding to the mode of utilization indicated by the request, the display processing unit, the printing processing unit, and the storage processing unit respectively corresponding to the display data decoding unit, the printing data decoding unit, and the storage data decoding unit; and in a case where the judgment indicates that the requested operation is not executable at a requested time, issuing a message indicating that a requested action is prohibited and indicating a time period that allows a requested action, the time period that allows the requested action being acquired from the applicable time information stored in the memory.

22. The storage medium according to claim 21, wherein execution of the printing operation and execution of the storage operation are prohibited until a certain period of time passes and permitted after the certain period of time passes.

23. A storage medium having program code instructions stored thereon which perform information access control when executed by a processor in an information utilization apparatus for requesting information for at least one of displaying, printing, or storing, wherein the accessibility of the information for each of the displaying, printing, or storing changes over time, determining the accessibility of the requested information for displaying, printing, or storing, and allowing displaying, printing, or storing of the requested information depending on the accessibility, the apparatus having a memory which stores information including encoded first data, the instructions comprising:

storing, in the memory, the encoded first data and applicable time information which defines a plurality of modes of utilization of the first data and executable time periods of operations respectively corresponding to the plurality of modes of utilization the plurality of modes of utilization including a display mode, a printing mode, and a storage mode, the applicable time information defining a displayable time period corresponding to the display mode, a printable time period corresponding to the printing mode, and a storable time period corresponding to the storage mode with respect to the first data;

judging if a requested operation is executable, upon a request entered via a user interface for an action for one of displaying, printing, and storing the first data, by reading the applicable time information from the memory and referring to an executable time period corresponding to a mode of utilization indicated by the request to compare with a current time;

decoding the first data stored in the memory by a decoding unit when the judgment indicates that the requested operation is executable;

preventing the decoding of the first data until a current time reaches the executable time period when the judgment does not indicate that the requested operation is executable, and decoding the first data by the decoding unit corresponding to the mode of utilization indicated by the request after a current time reaches the executable time period;

storing, in a data storage unit, second data obtained from decoding the first data;

executing the requested operation using the second data stored in the data storage unit by one of a display processing unit, a printing processing unit, and a storage processing unit, corresponding to the mode of utilization indicated by the request, the display processing unit, the printing processing unit, and the storage processing unit respectively corresponding to the display mode, the printing mode, and the storage mode;

executing another requested operation using the second data stored in the data storage unit, upon another request for operation execution, by one of the display processing unit, the printing processing unit, and the storage processing unit, corresponding to a mode of utilization indicated by another request, when the judgment indicates that the another requested operation is executable or after a current time reaches the executable time period when the judgment does not indicate that the another requested operation is executable; and in a case where the judgment indicates that the requested operation is not executable at a requested time, issuing a message indicating that a requested action is prohibited and indicating a time period that allows a requested action, the time period that allows the requested action being acquired from the applicable time information stored in the memory.

24. The storage medium according to claim 23, wherein execution of the printing operation and execution of the storage operation are prohibited until a certain period of time passes and permitted after the certain period of time passes.

* * * * *